(12) United States Patent
Stockmann

(10) Patent No.: US 12,407,687 B2
(45) Date of Patent: Sep. 2, 2025

(54) TECHNIQUES FOR DYNAMICALLY ADJUSTING AUTHENTICATOR ASSURANCE LEVELS

(71) Applicant: Okta, Inc., San Francisco, CA (US)

(72) Inventor: Johannes Stockmann, Woodinville, WA (US)

(*) Notice: Subject to any disclaimer, the term of this patent is extended or adjusted under 35 U.S.C. 154(b) by 265 days.

(21) Appl. No.: 18/160,615

(22) Filed: Jan. 27, 2023

(65) Prior Publication Data
US 2024/0259371 A1    Aug. 1, 2024

(51) Int. Cl.
*H04L 9/40*    (2022.01)

(52) U.S. Cl.
CPC ........ *H04L 63/0869* (2013.01); *H04L 63/105* (2013.01); *H04L 2463/082* (2013.01)

(58) Field of Classification Search
CPC ............... H04L 63/0869; H04L 63/105; H04L 2463/082
See application file for complete search history.

(56) References Cited

U.S. PATENT DOCUMENTS

| | | | |
|---|---|---|---|
| 2004/0193882 A1* | 9/2004 | Singerle, Jr. .......... | H04L 9/3226 713/168 |
| 2020/0280550 A1* | 9/2020 | Lindemann .......... | H04L 9/3247 |
| 2023/0091318 A1* | 3/2023 | Lindemann ............ | H04L 63/20 726/4 |

* cited by examiner

*Primary Examiner* — Azizul Choudhury
(74) *Attorney, Agent, or Firm* — Holland & Hart LLP

(57) ABSTRACT

Methods, systems, and devices for managing assurance levels are described. An identity provider (IDP) may obtain a request to enroll a first authenticator for accessing a resource via the IDP. The request may use a second authenticator to authorize enrollment of the first authenticator. The IDP may validate the second authenticator in response to the request. The IDP may enable the first authenticator to attest a first characteristic associated with the first authenticator in response to validating the second authenticator. The first authenticator may be enabled to attest the first characteristic based on the first characteristic being common to the first authenticator and the second authenticator. The IDP may enable the first authenticator to attest a second characteristic associated with the first authenticator based on an action that validates the second characteristic.

20 Claims, 12 Drawing Sheets

TECHNIQUES FOR DYNAMICALLY ADJUSTING AUTHENTICATOR ASSURANCE LEVELS

FIELD OF TECHNOLOGY

The present disclosure relates generally to database systems and data processing, and more specifically to techniques for dynamically adjusting authenticator assurance levels.

BACKGROUND

A software application may request that a user log in to an account using authenticators, such as a combination of a username and a password. Users who have accounts for several different applications may therefore maintain several different authenticators. The necessity of separately logging in to each application may impose a considerable burden on a user, who may use a different authenticator for each application. In some cases, a user may employ an identity provider (IDP) to help manage identifying information associated with the user, such that the user may access applications via the identity provider rather than separately logging in to each application. In some cases, an application may request that a user log in to an account associated with the application using an authenticator that provides a particular level of assurance. Accordingly, the identity provider may manage assurance levels associated with authenticators used to access the application via the identity provider. In some use cases, however, conventional techniques for managing authenticator assurance levels may be deficient or suboptimal in some current configurations.

SUMMARY

The described techniques relate to improved methods, systems, devices, and apparatuses that support dynamic adjustments to authenticator assurance levels. For example, an identity provider (IDP) may obtain a request from a user to enroll a first authenticator for accessing a resource via the IDP. In some examples, the request may use a second authenticator to authorize enrollment of the first authenticator. In response to the enrollment request, the IDP may validate the second authenticator. In some examples, such as in response to successfully validating the second authenticator, the IDP may enable the first authenticator to attest a first characteristic associated with the first authenticator. For example, the IDP may identify that the first characteristic is common to the first authenticator and the second authenticator. In some examples, the IDP may validate a second characteristic associated with the first authenticator based on one or more actions. The one or more actions may be performed subsequent to enrollment of the first authenticator. The IDP may enable the first authenticator to attest the second characteristic associated with the first authenticator based on the action that validates the second characteristic.

A method for managing assurance levels at a first device is described. The method may include obtaining, at a software platform of the first device, a request to enroll a first authenticator for accessing a resource via the software platform, where the request uses a second authenticator to authorize enrollment of the first authenticator, validating the second authenticator in response to the request, enabling the first authenticator to attest a first characteristic of a set of multiple characteristics associated with the first authenticator in response to validating the second authenticator, where the first authenticator is enabled to attest the first characteristic based on the first characteristic being common to the first authenticator and the second authenticator, and enabling the first authenticator to attest a second characteristic of the set of multiple characteristics associated with the first authenticator based on an action that validates the second characteristic.

An apparatus for managing assurance levels at a first device is described. The apparatus may include a processor, memory coupled with the processor, and instructions stored in the memory. The instructions may be executable by the processor to cause the apparatus to obtain, at a software platform of the first device, a request to enroll a first authenticator for accessing a resource via the software platform, where the request uses a second authenticator to authorize enrollment of the first authenticator, validate the second authenticator in response to the request, enable the first authenticator to attest a first characteristic of a set of multiple characteristics associated with the first authenticator in response to validating the second authenticator, where the first authenticator is enabled to attest the first characteristic based on the first characteristic being common to the first authenticator and the second authenticator, and enable the first authenticator to attest a second characteristic of the set of multiple characteristics associated with the first authenticator based on an action that validates the second characteristic.

Another apparatus for managing assurance levels at a first device is described. The apparatus may include means for obtaining, at a software platform of the first device, a request to enroll a first authenticator for accessing a resource via the software platform, where the request uses a second authenticator to authorize enrollment of the first authenticator, means for validating the second authenticator in response to the request, means for enabling the first authenticator to attest a first characteristic of a set of multiple characteristics associated with the first authenticator in response to validating the second authenticator, where the first authenticator is enabled to attest the first characteristic based on the first characteristic being common to the first authenticator and the second authenticator, and means for enabling the first authenticator to attest a second characteristic of the set of multiple characteristics associated with the first authenticator based on an action that validates the second characteristic.

A non-transitory computer-readable medium storing code for managing assurance levels at a first device is described. The code may include instructions executable by a processor to obtain, at a software platform of the first device, a request to enroll a first authenticator for accessing a resource via the software platform, where the request uses a second authenticator to authorize enrollment of the first authenticator, validate the second authenticator in response to the request, enable the first authenticator to attest a first characteristic of a set of multiple characteristics associated with the first authenticator in response to validating the second authenticator, where the first authenticator is enabled to attest the first characteristic based on the first characteristic being common to the first authenticator and the second authenticator, and enable the first authenticator to attest a second characteristic of the set of multiple characteristics associated with the first authenticator based on an action that validates the second characteristic.

Some examples of the method, apparatuses, and non-transitory computer-readable medium described herein may further include operations, features, means, or instructions for determining an assurance level associated with the first authenticator in accordance with the first characteristic that may be common to the first authenticator and the second authenticator and updating the assurance level associated with the first authenticator based on validating the second characteristic, where the assurance level may be updated in accordance with the second characteristic.

Some examples of the method, apparatuses, and non-transitory computer-readable medium described herein may further include operations, features, means, or instructions for authorizing enrollment of the first authenticator in response to the request and based on validating the second authenticator, where enabling the first authenticator to attest the first characteristic may be based on the enrollment of the first authenticator.

In some examples of the method, apparatuses, and non-transitory computer-readable medium described herein, the action that validates the second characteristic may include operations, features, means, or instructions for validating a third authenticator associated with the second characteristic in response to the enrollment of the first authenticator.

Some examples of the method, apparatuses, and non-transitory computer-readable medium described herein may further include operations, features, means, or instructions for obtaining an indication that configures the software platform to trigger the action that validates the second characteristic in response to the enrollment of the first authenticator.

In some examples of the method, apparatuses, and non-transitory computer-readable medium described herein, the request may be obtained from a second device and the method, apparatuses, and non-transitory computer-readable medium may include further operations, features, means, or instructions for obtaining a second request from a third device to validate a third authenticator associated with the second characteristic, where the third authenticator may be enrolled on the third device, and where the action that validates the second characteristic includes validating the third authenticator.

In some examples of the method, apparatuses, and non-transitory computer-readable medium described herein, the second device and the third device may be associated with a same user.

Some examples of the method, apparatuses, and non-transitory computer-readable medium described herein may further include operations, features, means, or instructions for validating the third authenticator may be based on a distance between the second device and the third device satisfying a threshold distance.

In some examples of the method, apparatuses, and non-transitory computer-readable medium described herein, the second device may be associated with a first user and the third device may be associated with a second user.

Some examples of the method, apparatuses, and non-transitory computer-readable medium described herein may further include operations, features, means, or instructions for validating the third authenticator may be based on a distance between the first user and the second user satisfying a threshold distance.

In some examples of the method, apparatuses, and non-transitory computer-readable medium described herein, a first connection used to obtain the request may be different from a second connection used to obtain the second request.

In some examples of the method, apparatuses, and non-transitory computer-readable medium described herein, the action that validates the second characteristic may include operations, features, means, or instructions for obtaining an indication that the second device satisfies a criterion.

Some examples of the method, apparatuses, and non-transitory computer-readable medium described herein may further include operations, features, means, or instructions for obtaining a second request to access the resource, where the second request uses the first authenticator to authorize access to the resource, validating the first authenticator in response to receiving the second request, and authorizing access to the resource in response to validating the first authenticator and based on the first authenticator being enabled to attest the first characteristic and the second characteristic.

In some examples of the method, apparatuses, and non-transitory computer-readable medium described herein, the software platform includes an IDP.

DETAILED DESCRIPTION

Figure 1:
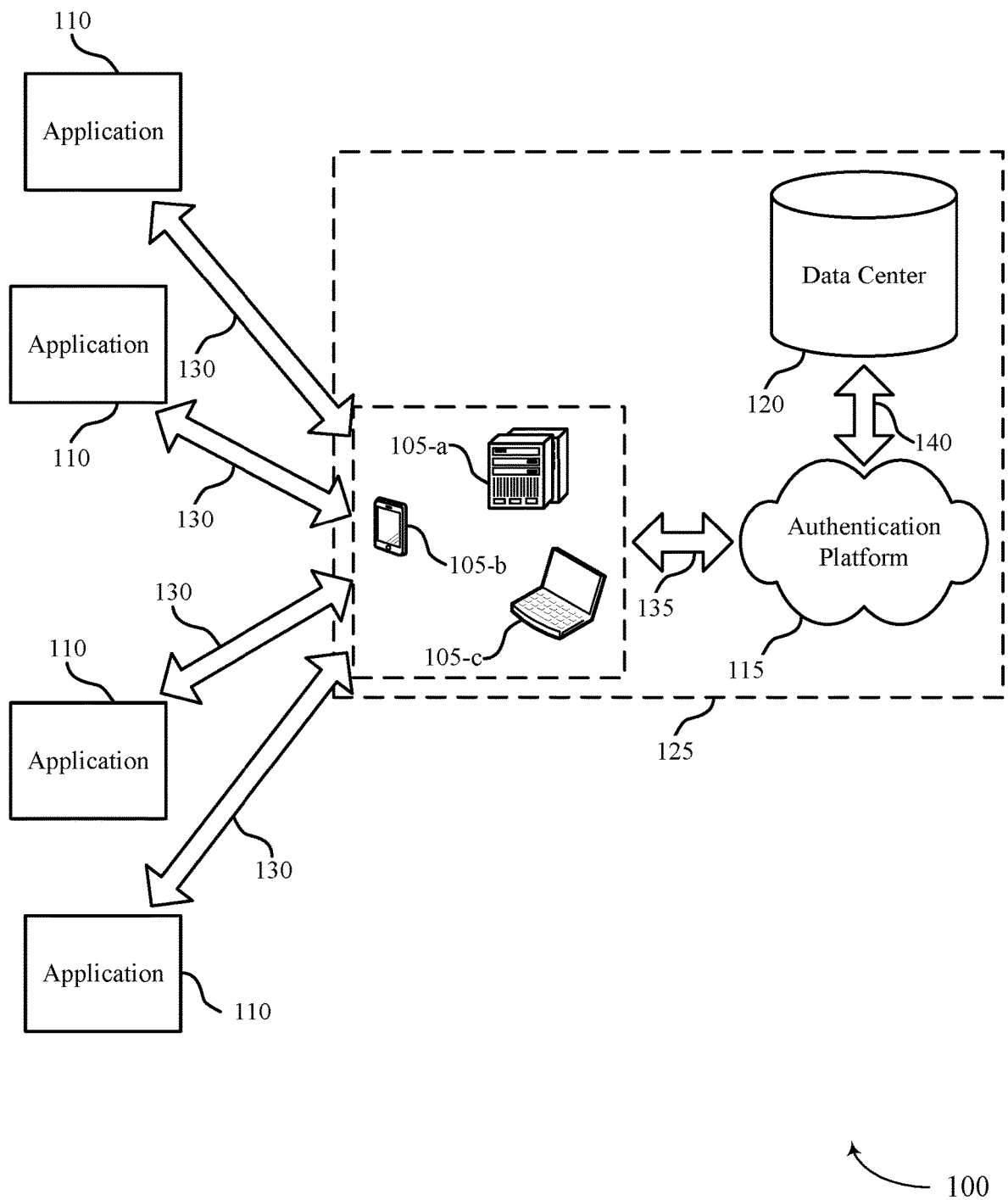
FIG. 1 illustrates an example of a system that supports techniques for dynamically adjusting authenticator assurance levels in accordance with aspects of the present disclosure.

Some software applications may constrain access to the applications in accordance with one or more assurance levels. For example, an application may request that a user log in to an account associated with the application using authenticators that provide a particular level of assurance. As described herein, an authenticator may refer to a means or object used to confirm a user's identity (e.g., to perform digital authentication). For example, a user may use an authenticator to confirm (e.g., verify, authenticate) the user's identity, such that the user may gain access a resource, such as the application. Some examples of authenticators may include a device, software-based authenticators, web-based authenticators, an email, a password, or a piece of personal identification, such as a driver's license, among other examples of authenticators. In other words, an authenticator may include authentication information. Users who have accounts for several different applications may maintain several different authenticators and separately logging in to each application may impose a considerable burden on a user that may use a different authenticator for each application. In some cases, the user may use a software platform to manage identifying information associated with the user, such that the user may access multiple applications via the software platform rather than separately logging in to each application. As described herein, a software platform may refer to an environment in which a piece of software (e.g., code) may be executed. In some examples, the software platform may be hardware, an operating system, a web browser and associated application programming interfaces, or other software capable of executing code (e.g., program code). In some instances, a software platform may also be referred to as a computing platform or a digital platform.

In some examples, some software platforms used to manage identifying information associated with users may be referred to as identity provider (IDPs). For example, an IDP may be a software platform (e.g., a service) that stores and manages digital identities of users. In some examples, companies (or organizations) may use an IDP to manage access to resources associated with the companies and user may use the IDP to manage identifying information associated with a user, such that the user may access the resources. For example, the IDP may manage log in requests from users, verify authenticators used for the login requests, and authorize access to resources associated with the request. An authenticator may be associated with an assurance level that corresponds to (e.g., is indicative of) a degree of confidence in the identity of a user who is attempting to gain access to a resource with the authenticator (e.g., that the user is who they say they are). In some examples, an administrator of an application may request that authenticators used to log in to accounts associated with the application provide a particular level of assurance, the IDP may manage assurance levels associated with authenticators used to access the application via the IDP.

In some examples, the IDP may assign an assurance level to an authenticator used for access the application based on characteristics (e.g., properties) associated with the authenticator. For example, a first authenticator may be associated with (e.g., capable of verifying, capable of attesting) a phishing resistant characteristic. Accordingly, the application may assign a first assurance level to the first authenticator that is based on the phishing resistant characteristic. In some examples, the application may request that authenticators used to log in to accounts associated with the application provide the first level of assurance. That is, the application may request that authenticators used to log in to accounts associated with the application are associated with the phishing resistant characteristic (e.g., are capable of verifying phishing resistance, are capable of attesting phishing resistance). In such an example, the IDP may enable the first authenticator to be used for access the application. That is, the IDP may determine that the first authenticator provides a sufficient level of assurance for accessing the application. Accordingly, the IDP may authorize access to the application in response to validating the first authenticator.

In some examples, however, enrollment of authenticators may lead to one or more security risks. For example, a user may enroll the first authenticator that is associated with the phishing resistant characteristic using a second authenticator that is incapable of attesting phishing resistance. For instance, the second authenticator may be a knowledge-based authenticator, such as a password. In such an example, the user may be an attacker that obtained the password used to enroll the first authenticator fraudulently, such as via a phishing attack. In such an example, because the first authenticator was enrolled with phished credentials (e.g., the credentials obtained via the phishing attack) the phishing resistant characteristic associated with the first authenticator may be ineffective. In other words, an authenticator enrolled using phished credentials may be incapable of attesting phishing resistance. To reduce a likelihood of authentication methods being bypassed by the attacker, the administrator may determine that enrollment of an authenticator associated with a particular characteristic may be based on another authenticator associated with the same characteristic. That is, the administrator may determine that enrollment of a phishing resistant authenticator is to be based on another phishing resistant authenticator (or a phishing resistant authentication method). In some cases, however, an authenticator may be bound to a device (e.g., device bound), which may prevent the authenticator from be used for authentication on multiple devices, for example to enroll another instances of the authenticator. As such, to enable use of a device bound authenticator on multiple devices the administrator may bypass enrollment (e.g., and accept the associated security risk) or increase a complexity associated with the enrollment process, which may be problematic in some work environments, such as remote-first work environments.

Various aspects of the present disclosure may provide a framework for enabling an IDP to dynamically adjust assurance levels associated with authenticators. For example, aspects of the present disclosure may enable the IDP to assign some characteristics to authenticators based on enrollment (e.g., and registration) of the authenticators with the IDP and assign (e.g., restore) other characteristics of the authenticators (e.g., dynamically) based on one or more actions (e.g., subsequent to enrollment). For example, the IDP may downgrade or restore characteristics of an authenticator based on one or more actions taken by a user that enrolled the authenticator or an administrator of an application that the authenticator is being used to access. Additionally, or alternatively, the IDP may downgrade or restore characteristics of an authenticator based on one or more automated processes. For example, the IDP may obtain a request from a user to enroll a first authenticator for accessing an application via the IDP. In such an example, the request may use a second authenticator to authorize the enrollment of the first authenticator. The IDP may validate the second authenticator in response to receiving the request and determine that the second authenticator is capable of attesting a first characteristic associated with the first authenticator. Accordingly, the IDP may authorize enrollment of the first authenticator and enable the first authenticator to attest (e.g., verify) the first characteristic for accessing the application. As described herein, the IDP enabling an authenticator to attest a characteristic may correspond to the IDP confirming (e.g., certifying) that the authenticator may provide proof of the characteristic.

In some examples, however, the first authenticator may be associated with one or more other characteristics that the second authenticator may be incapable of attesting. In such examples, the IDP may validate a second characteristic via one or more actions. The one or more actions may include validation of a third authenticator, an automated workflow (e.g., based on signals collected during authorization of the enrollment of the first authenticator), or a manual verification process, among other examples. For example, the IDP may validate a third authenticator capable of attesting the second characteristic. In such examples, based on validating the third authenticator, the IDP may validate the second characteristic and enable the first authenticator to attest the second characteristic for accessing the application. That is, the IDP may restore the second characteristic to the first authenticator based on validating the third authenticator, which is also associated with (and which is capable of attesting) the second characteristic. In some examples, the IDP may authorize access to the application in response to validating the first authenticator and based on the first authenticator being enabled to attest the first characteristic and the second characteristic. In some examples, by dynamically adjusting the characteristics that the first authenticator is enabled to attest, the IDP may provide for the increased security associated with transferring authenticator characteristics from one device to another and increased flexibility associated with authenticator enrollment, among other possible benefits.

Aspects of the disclosure are initially described in the context of a system for distributed computing. Aspects of the disclosure are also described in the context of procedures and a process flow. Aspects of the disclosure are further illustrated by and described with reference to apparatus diagrams, system diagrams, and flowcharts that relate to techniques for dynamically adjusting authenticator assurance levels.

FIG. 1 illustrates an example of a system 100 for distributed computing (e.g., cloud computing) that supports techniques for dynamically adjusting authenticator assurance levels in accordance with various aspects of the present disclosure. The system 100 includes client devices 105, applications 110, authentication platform 115, and data storage 120. Authentication platform 115 may be an example of a public or private cloud network. A client device 105 may access authentication platform 115 over network connection 135. The network may implement transmission control protocol and internet protocol (TCP/IP), such as the Internet, or may implement other network protocols. A client device 105 may be an example of a user device, such as a server (e.g., client device 105-a), a smartphone (e.g., client device 105-b), or a laptop (e.g., client device 105-c). In other examples, a client device 105 may be a desktop computer, a tablet, or another computing device or system capable of generating, analyzing, transmitting, or receiving communications. In some examples, a client device 105 may be operated by a user that is part of a business, an enterprise, a non-profit, a startup, or any other company type (e.g., organization type).

A client device 105 may interact with multiple applications 110 using one or more interactions 130. The interactions 130 may include digital communications, application programming interface (API) calls, hypertext transfer protocol (HTTP) messages, or any other interaction between a client device 105 and an application 110. Data may be associated with the interactions 130. A client device 105 may access authentication platform 115 to store, manage, and process the data associated with the interactions 130. In some examples, the client device 105 may have an associated security or permission level. A client device 105 may have access to some applications, data, and database information within authentication platform 115 based on the associated security or permission level, and may not have access to others.

Applications 110 may interact with the client device 105 via email, web, text messages, or any other suitable form of interaction. The interaction 130 may be a business-to-business (B2B) interaction or a business-to-consumer (B2C) interaction. An application 110 may also be referred to as a customer, a client, a website, or some other suitable terminology. In some examples, the application 110 may be an example of a server, a node, a computer cluster, or any other type of computing system, component, or environment. In some examples, the application 110 may be operated by a user or a group of users.

Authentication platform 115 may offer cloud-based services to the client devices 105, the applications 110, or both. In some examples, the authentication platform 115 may support a database system such as a multi-tenant database system. In such cases, authentication platform 115 may serve multiple client devices 105 with a single instance of software. However, other types of systems may be implemented, including—but not limited to—client-server systems, mobile device systems, and mobile network systems.

Authentication platform 115 may receive data associated with interactions 130 from the client device 105 over network connection 135, and may store and analyze the data. In some examples, authentication platform 115 may receive data directly from an interaction 130 between an application 110 and the client device 105. In some examples, the client device 105 may develop applications to run on authentication platform 115. Authentication platform 115 may be implemented using remote servers. In some examples, the remote servers may be examples of data storage 120.

Data storage 120 may include multiple servers. The multiple servers may be used for data storage, management, and processing. Data storage 120 may receive data from authentication platform 115 via connection 140, or directly from the client device 105 or an interaction 130 between an application 110 and the client device 105. Data storage 120 may utilize multiple redundancies for security purposes. In some examples, the data stored at data storage 120 may be backed up by copies of the data at multiple locations.

Subsystem 125 may include client devices 105, authentication platform 115, and data storage 120. In some examples, data processing may occur at any of the components of subsystem 125, or at a combination of these components. In some examples, servers may perform the data processing. The servers may be a client device 105 or located at data storage 120.

In some examples, the applications 110 may request that users (e.g., via one or more of the client devices 105) log in to an account using authenticators. In some cases, the user may use the subsystem 125 (e.g., an IDP) to manage identifying information associated with the users. Accordingly, the users may access the applications 110 via the subsystem 125 rather than separately logging in to each of the applications 110. In some examples, an administrator of an application 110 may request that authenticators used to log in to accounts associated with the application 110 provide a particular level of assurance (e.g., satisfy a threshold assurance level). Accordingly, the subsystem 125 may maintain an authenticator record for authenticators enrolled with the subsystem 125 (e.g., for accessing the applications 110). An authenticator record for an authenticator may include a list of characteristics the authenticator may be capable of verifying. For example, a first authenticator may be capable of verifying (e.g., capable of attesting to) a phishing resistant characteristic and the subsystem 125 may assign a first assurance level to the first authenticator that is based on the first authenticator being capable of verifying the phishing resistant characteristic.

In some examples, however, enrollment of an authenticator may lead to one or more security risks. For example, a user may request to enroll the first authenticator, which may be associated with a phishing resistant characteristic, on a client device 105-a using a second authenticator that may be incapable of attesting phishing resistance. For example, the second authenticator may be a knowledge-based authenticator, such as a password. In such an example, the user may be an attacker that obtained the password used to enroll the first authenticator fraudulently, such as via a phishing attack. In such an example, because the first authenticator was enrolled with phished credentials (e.g., the credentials obtained via the phishing attack) the phishing resistant characteristic of the first authenticator may be ineffectual. In some examples, to reduce a likelihood of authentication methods from being bypassed by an attacker, the administrator of an application 110 may set up an access policy in which an authenticator used to access the application 110 may be associated with a characteristic that satisfies a threshold assurance level for the application 110. Additionally, the access policy may specify that enrollment of such an authenticator may be based on another authenticator associated with the same characteristic. For example, the administrator may determine that a phishing resistant authenticator is to be used for accessing the application 110 and, therefore, enrollment of the phishing resistant authenticator is to be based on another phishing resistant authenticator. In some cases, however, a phishing resistant authenticator may be bound to a device (e.g., device bound), which may prevent the phishing resistant authenticator from being used for authentication on multiple devices.

For example, the user may enroll the phishing resistant authenticator on the client device 105-*b* (e.g., a phone). Accordingly, the phishing resistant authenticator may be bound to the client device 105-*b*. In some examples, the user may desire (e.g., wish, want) to enroll another instance of the phishing resistant authenticator on another device, such as the client device 105-*c* (e.g., a laptop). In such examples, because the phishing resistant authenticator is bound to the client device 105-*b*, the user may be incapable of using the phishing resistant authenticator to enroll another instance of the phishing resistant authenticator on the client device 105-*c*. In other words, because the user enrolled the client device 105-*b* with the phishing resistant authenticator, the phishing resistant authenticator cannot be lifted off the client device 105-*b* and, therefore, the user may use (e.g., may only use) the client device 105-*b* to authenticate with the phishing resistant authenticator. In some examples, an inability to use an authenticator on multiple devices may be problematic for onboarding or enrollment. As such, to enable enrollment of phishing resistant authenticators (or other types of authenticators that may be device bound) on multiple devices the administrator may bypass enrollment (e.g., and accept the associated security risks) or increase a complexity of (e.g., harden) the enrollment process, which may be problematic (e.g., may create one or more issues) in a remote-first work environment or another environment in which users may use multiple devices. In other words, because a first phishing resistant authenticator (or other type of device bound authenticator) may not be transferred from one of the client devices 105 to another without re-enrolling, enrollment of a phishing resistant authenticator (or another instance of the first phishing resistant authenticator) on the client device 105-*c* using the phishing resistant authenticator enrolled on the client device 105-*b* may be relatively difficult.

In some examples, the subsystem 125 may support one or more techniques for dynamically adjusting authenticator assurance levels. For example, the subsystem 125 may assign characteristics to an authenticator based on registration (e.g., enrollment) of the authenticator with the subsystem 125 and enable the characteristics of the authenticator to be downgraded or restored based on actions taken by the user that enrolled the authenticator (e.g., via one or more of the client devices 105) or by an administrator of an application 110 that the authenticator may be used to access. Additionally, or alternatively, the subsystem 125 may downgrade or restore characteristics associated with the authenticator based on one or more automated processes.

For example, the subsystem 125 may obtain a request from the user via the client device 105-*c* to enroll a first authenticator for accessing an application 110 via the subsystem 125. The first authenticator may be associated with a first characteristic (e.g., hardware protected) and a second characteristic (e.g., phishing resistant). For example, the first authenticator may be a biometric sensor (e.g., a touch ID) on the client device 105-*c* and may be associated with hardware protected and phishing resistant characteristics. The request may uses a second authenticator that may be capable of attesting the first characteristic and incapable of attesting the second characteristic. That is, the user may request (e.g., via the client device 105-*c*) that the subsystem 125 (e.g., the IDP) authorize enrollment of a biometric sensor (e.g., the first characteristic) using a PUSH notification (e.g., the second characteristic) received via the client device 105-*c*. For example, the subsystem 125 may send a PUSH notification (e.g., the second authenticator) to the user via the client device 105-*c* in response to receiving the request to enroll the biometric sensor (e.g., the first authenticator). The PUSH notification may be capable of attesting hardware protection (e.g., the first characteristic) and incapable of attesting phishing resistance (e.g., the second characteristic). The subsystem 125 may authorize enrollment of the biometric sensor based on the subsystem 125 validating the PUSH notification (e.g., in response to the user performing some action via the client device 105-*c*, such as pressing a button, to approve the request). In other words, the subsystem 125 may authorize enrollment of the first authenticator based on validating the second authenticator. Accordingly, the subsystem 125 may register the first authenticator with the subsystem 125 (e.g., the IDP) for accessing the application 110. Because the second authenticator is capable of attesting the first characteristic, based on enrollment (e.g., and registration) of the first authenticator using the second authenticator, the subsystem 125 may enable the first authenticator to attest the first characteristic.

In some examples, the first characteristic may be associated with a first assurance level and the second characteristic may be associated with a second assurance level that is increased relative to the first assurance level. That is, an assurance level associated with phishing resistance may be increased relative to an assurance level associated with hardware protection. In other words, assurances provided by phishing resistance may be higher than assurances provided by hardware protection. Accordingly, the hardware protected characteristic may fail to satisfy a threshold (e.g., maximum) assurance level associated with the first authenticator, which may be associated with the first characteristic and the second characteristic. Additionally, or alternatively, the first assurance level may fail to satisfy a threshold assurance level associated with the application 110. For example, an administrator of the application 110 may configure a policy for the application 110 that identifies (e.g., defines, specifies) a threshold assurance level for accessing the application 110. In such an example, if the first assurance level associated with the first authenticator fails to satisfy the threshold assurance level, the IDP (e.g., the subsystem 125) may challenge another authenticator (e.g., factor) to authorize access to the application 110. In other words, the first authenticator may be insufficient for accessing the application 110, which may necessitate that the user (e.g., via one or more of the client devices 105) use another authenticator to gain access to the application 110.

In some examples, to enable the first authenticator to attest the second characteristic, the subsystem 125 may validate the second characteristic via one or more restore actions. In some examples, a restore action may include validation of a third authenticator capable of attesting the second characteristic, an automated workflow (e.g., based on signals collected during authorization of the enrollment of the first authenticator), or a manual verification process, among other examples. For example, the user may have previously enrolled a biometric sensor (or another type of authenticator capable of attesting phishing resistance) on the client device 105-*b*. In such an example, the user may use the biometric sensor on the client device 105-*b* to confirm (e.g., with the subsystem 125) that the request to enroll the first authenticator originated from the user. In other words, the subsystem 125 may validate the third authenticator, thereby validating the second characteristic. Accordingly, subsystem 125 may enable the first authenticator to attest the second characteristic for accessing the application based on validating the second characteristic. In other words, the user may enroll the first authenticator that may be capable of attesting phishing resistance, using a PUSCH notification and a password, which may be capable of attesting hardware protection and incapable of attesting phishing resistance. The subsystem 125 may enroll the first authenticator on the client device 105-*c* and enable the first authenticator to attest hardware protection. The user may use the client device 105-*b* (e.g., a device that the user may have been previously enrolled a phishing resistant authenticator on) to confirm with the subsystem 125 that the client device 105-*c* is associated with (e.g., belongs to) the user and, in response, the subsystem 125 may enable the first authenticator to attest phishing resistance (e.g., may enable the first authenticator on the client device 105-*c* to be upgraded such that the first authenticator may attest phishing resistance). In some examples, by dynamically adjusting the characteristics that the first authenticator may attest, the subsystem 125 may reduce security risks and increase a flexibility associated with authenticator enrollment for the applications 110, among other possible benefits.

It should be appreciated by a person skilled in the art that one or more aspects of the disclosure may be implemented in a system 100 to additionally, or alternatively, solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
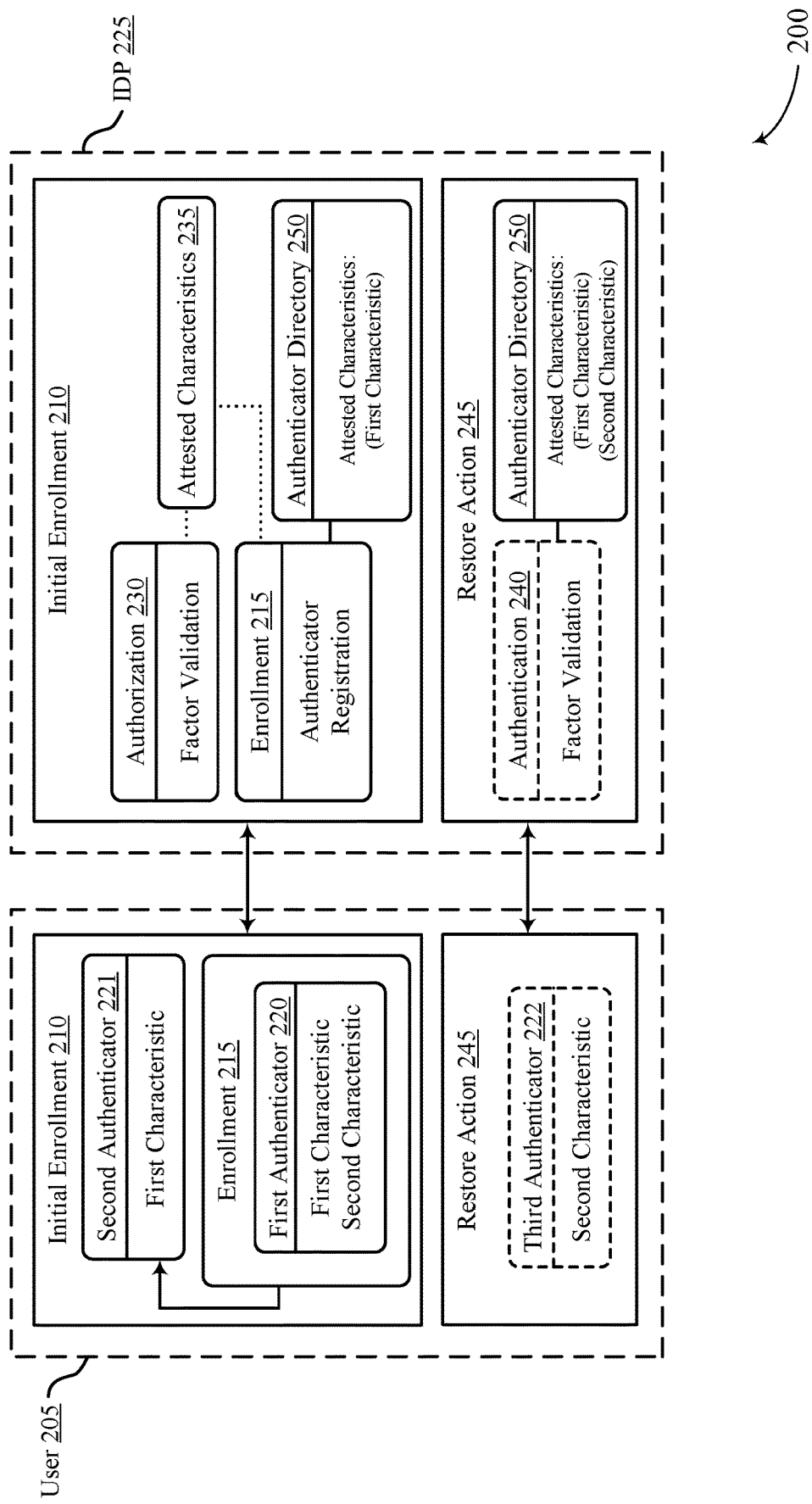
FIGS. 2, 3A, 3B, 4A, and 4B each illustrate an example of a procedure that supports techniques for dynamically adjusting authenticator assurance levels in accordance with aspects of the present disclosure.

FIG. 2 illustrates an example of a procedure 200 that supports techniques for dynamically adjusting authenticator assurance levels in accordance with aspects of the present disclosure. The procedure 200 may implement or be implemented by aspects of the system 100. For example, one or more aspects of the procedure 200 may be implemented by a user 205 via a client device, which may be an example of a client device illustrated by and described with reference to FIG. 1. Additionally, one or more aspects of the procedure 200 may be implemented by an IDP 225 (e.g., a software platform), which may be an example of subsystem 125 as described with reference to FIG. 1.

In some examples, an application may use one or more authenticators to verify (e.g., confirm, authenticate) an identity of the user 205. Some examples of authenticators may include a client device, a multi-factor authentication application (or another type of software-based authenticator), web-based authenticators (e.g., web authentication (WebAuthn), an email, a password, or personal identification (e.g., a driver's license), among other examples of authenticators. Authenticators may provide one or more authentication methods (e.g., a PUSH notification, a time-based one time password (TOTP), a short message service (SMS), voice, an email magic link, a security key) which may provide one or more (e.g., additional) method characteristics, such as a phishing resistant characteristic, a hardware protected characteristic, or a device bound characteristic, among other examples of method characteristics. In other words, authenticators may be capable of attesting to (e.g., may have) one or more characteristics (e.g., properties) and for multiple (e.g., different) authentication policies an administrator may use characteristics of an authenticator to reduce a likelihood of unauthorized access to a resource managed by the administrator (e.g., ensure authorized access to the resource). Some examples of authenticator characteristics (e.g., properties) may include factor types, such as knowledge-based factors, possession-based factors, and inherence-based factors. A possession-based factor, which may also be referred to a possession-based authenticator (e.g., a possession authenticator), may include an object that a user possess (e.g., has in their possession), such as a phone or access to an email account. A knowledge-based factor, which may also be referred to as a knowledge-based authenticator (e.g., a knowledge authenticator), may include information that a user possess (e.g., knows), such as a password or an answer to a security question. An inherence-based factor, which may also be referred to as an inherence-based authenticator (e.g., an inherence authenticator), may be an element integral to a user (e.g., an element unique to a user), such as a biometric. In some examples, a biometric may be represented by a physical attribute of the user that can be scanned by a device, such as a fingerprint reader or facial scanner.

In some examples, to increase (e.g., raise) an assurance levels used to access an application, and to mitigate unauthorized access, administrators of the application may use method characteristics as security measures (e.g., additional security measures beyond increasing a quantity of factors). That is, some other examples of authenticator characteristics (e.g., properties) may include authentication method characteristics, such as device bound, hardware protected, phishing resistant, or user presence. Device bound authenticators may include authenticators, such as a device key or secret, that may be stored on a device and that may not be extracted from the device and transferred to another device without re-enrolling. Hardware protected authenticators may include authenticators that provides hardware protection of secrets or private keys. For example, a hardware protected authenticator may include a device key stored on a separate device, in a trusted platform module (TPM), in a secure enclave, or on a separate hardware token. Phishing resistant authenticators may include authenticators that cryptographically verifies a login server. User presence authenticators may include authenticators which a user can prove possession (e.g., control) of by actively authenticating and which may demonstrate physical presence of the user. For example, a user presence authenticator may include an authenticator that the user interacts with, such as by entering a one-time password or scanning a fingerprint, among other examples.

In some examples, a breach may be caused by a phishing attack against a user. To mitigate phishing attacks, the administrator may set up one or more access policies that use (e.g., rely on) phishing resistant authentication methods to be used for one or more resources, such as security-critical resources. For example, the administrator may set up an access policy that relies on passwordless authentication methods, such as a web-based passwordless authentication method or an application-based passwordless authentication method, to authorize access to resources (e.g., the security-critical resource). In some examples, however, enrollment of a phishing resistant authenticator may lead to one or more security risks. For example, a user may enroll a first phishing resistant authenticator (an authenticator that may be capable of attesting phishing resistance) using a knowledge-based authenticator (e.g., an authenticator that may be incapable of attesting phishing resistance, such as a password). In such an example, an attacker may obtain (e.g., via a phishing attack) credentials (e.g., the password) of the user during enrollment of the first phishing resistant authenticator and use the credentials to enroll a second phishing resistant authenticator (e.g., another authenticator that may be capable of attesting phishing resistance). However, because the second phishing resistant authenticator was enrolled with phished credentials (e.g., the credentials obtained via the phishing attack) the phishing resistant characteristic of the second phishing resistant authenticator may be ineffective.

In some examples, to reduce a likelihood of (e.g., to prevent) phishing resistant authentication methods from being bypassed by the attacker, the administrator may determine that enrollment of a phishing resistant authenticator is to be based on another phishing resistant authenticator. That is, to enroll an authenticator capable of attesting characteristics that fulfill constraints of one or more access policies, such as using a phishing resistant characteristic, the administrator or IDP 225 (or both) may specify (e.g., ensure) that enrollment of the authenticator may be gated (e.g., controlled, authorized) by another authenticator capable of attesting (e.g., verifying) the same characteristics (e.g., the characteristics that the authenticator being enrolled is capable of attesting). In other words, enrollment of a phishing resistant authenticator (e.g., an authenticator capable of attesting phishing resistance) may be authorized using another phishing resistant authenticator (e.g., another authenticator capable of attesting phishing resistance). Accordingly, the authentication for the enrollment process of a phishing resistant authenticator may involve validating another phishing resistant authenticator.

In some cases, however, phishing resistant authenticators may be device bound, which may prevent the phishing resistant authenticators from be used for authentication on multiple devices (e.g., may prevent enrollment of a phishing resistant authenticator on multiple devices). For example, the user 205 may enroll a phishing resistant authenticator on a first device (e.g., a phone). Accordingly, the phishing resistant authenticator may be bound to the first device. In some examples, the user 205 may desire (e.g., wish, want) to enroll another instance of the phishing resistant authenticator on a second device (e.g., a laptop). In such examples, however, because the phishing resistant authenticator is bound to the first device, the user may be incapable of using the phishing resistant authenticator to enroll another instance of the phishing resistant authenticator on the second device. In other words, because the user enrolled the first device with the phishing resistant authenticator, the phishing resistant authenticator cannot be lifted off the first device and, therefore, the user may use (e.g., may only use) the first device to authenticate with the phishing resistant authenticator. In some examples, an inability to use an authenticator on multiple devices may be problematic for onboarding or enrollment of the authenticator. In some examples, to enable enrollment of phishing resistant authenticators (or other types of authenticators that may be device bound) on multiple devices the administrator may bypass enrollment (e.g., and accept the associated security risk) or increase a complexity (e.g., harden) the enrollment process, which may be problematic (e.g., may create one or more issues) in a remote-first work environment or another environment in which users may use multiple devices. In other words, because a first phishing resistant authenticator (or other type of device bound authenticator) may not be transferred from one device to another without re-enrolling, enrollment of the second phishing resistant authenticator (or another instance of the first phishing resistant authenticator) using the first phishing resistant authenticator may be relatively difficult.

For example, the administrator of the harden the enrollment process for authenticators such that authenticators that provide relatively high assurance levels may be (e.g., may only be) enrolled by the administrator or by the user 205 (e.g., an end user), for example while providing authentication methods with the same relatively high assurance levels. In some examples, since some relatively high assurance authenticators may be incapable of roaming between devices (e.g., may be device bound) hardening of the enrollment process may constrain (e.g., block) enrollment for some users. Additionally, or alternatively, the administrator (e.g., of a company associated with the administrator) may determine (e.g., specify) that authenticators are to be enrolled in trusted environments (e.g., in an office associated with the company). In some other examples, the administrator may harden the enrollment process by using centrally enrolled and distributed authenticators. For example, the company may distribute hardware authentication devices to employees (e.g., users). In such an example, the company may use in person identity proofing of the employees prior to the administrator (e.g., a security administrator) allowing the employees to enroll an authenticator. In some examples, using centrally enrolled and distributed authenticators may lead to logistical constraints and may not scale for some companies. Additionally, or alternatively, use of centrally enrolled and distributed authenticators may fail in a remote first work environment or if an employee loses access to an authenticators (e.g., loses the hardware authentication device).

Characteristics of an authenticator may be determined (e.g., directly determined) by an authenticator type of the authenticator. For instance, WebAuthn authenticators may be deemed phishing resistant irrespective of whether the WebAuthn authenticators are capable of verifying phishing resistance. Similarly, possession authenticators (e.g., other than email or phone) may be deemed possession factors, irrespective of whether the possession authenticators are capable of verifying possession. That is, in some examples, IDPs (or administrators) may determine that an authenticator is capable of verifying one or more characteristics based on the authenticator being a particular type of authenticator (e.g., based on an authenticator type associated with the authenticator). In such examples, the IDPs may enable the authenticator to verify the one or more characteristics irrespective of whether the authenticator is capable of verifying the one or more characteristics. For example, the authenticator may be a phishing resistant authenticator and the IDPs may enable the authenticator to verify phishing resistance irrespective of whether enrollment of the authenticator used a phishing resistant authenticator (e.g., used another instance of the authenticator or used another phishing resistant authenticator), which may lead to one or more security risks.

In some examples, the IDP 225 may support dynamically adjusted assurance levels for authenticators, as described herein, which may enable the IDP 225 to reduce a likelihood of characteristics (e.g., characteristic constraints) of an authenticator being bypassed through enrollment while reducing (or maintaining) a complexity of the enrollment process and the verification process (e.g., of verification constrains). For example, the IDP 225 may dynamically adjust assurance levels for authenticators, such that assumptions associated with characteristics of an authenticator that may be based on an authenticator type associated with the authenticator may be removed. In other words, the IDP 225 may refrain from assigning characteristics to authenticators (or enabling the authenticators to attest characteristics) based on authenticator types associated with the authenticators. For example, one or more aspects of dynamically adjusted assurance levels for authenticators, as described herein, may enable characteristics of an authenticator to be based on (e.g., to become) characteristics associated with registration of the authenticator with the IDP 225 (e.g., a specific authenticator registration) and may enable the characteristics of the authenticator to be downgraded or restored based on actions taken by the user 205 (an end user that enrolled the authenticator), the administrator, or by one or more automated processes, such as a workflow. For example, if the user 205 enrolls an authenticator associated with a phishing resistant characteristic (e.g., a phishing resistant authenticator) that may be capable of providing proof of possession (e.g., may be capable of attesting one or more characteristics associated with a possession factor), the phishing resistant characteristic of the authenticator may be (e.g., may only be) set on the authenticator (e.g., an object) if one or more authentication methods used for enrollment of the authenticator are also phishing resistant. In some examples, if the one or more authentication methods are not phishing resistant, the IDP 225 may refrain from setting the phishing resistant characteristic (e.g., a flag) and the authenticator may be used to verify (e.g., attest) proof of possession (e.g., the authenticator cannot fulfill the phishing resistant constraint).

As illustrated in the example of FIG. 2, the user 205 (e.g., via a client device) may enroll a first authenticator 220 (e.g., during an initial enrollment 210) that may be associated with a first characteristic and a second characteristic. The first characteristic and the second characteristic may each be an example of a characteristic (also referred to as a property) of an authenticator or an authentication method. For example, the first characteristic or the second characteristic may include ownership verifying, device bound, hardware protected, phishing resistant, user verifying (e.g., user presence), or inherence, among other examples. In other words, the first authenticator 220 may correspond to an authenticator type (e.g., a factor type) that is associated with the first characteristic (e.g., a hardware protected characteristic) and the second characteristic (e.g., phishing resistant characteristic). In some examples, the second characteristic may be associated with (e.g., provide) increased assurances relative to the first characteristic. For example, a first assurance level associated with the first characteristic may be lower than a second assurance level associated with the second characteristic. In such an example, the second characteristic may provide a relatively higher degree of confidence in the identity of the user 205 (e.g., that the user 205 is who they say they are) than the first characteristic. In the example of FIG. 2, the user 205 may use a second authenticator 221 (e.g., an authenticator previously enrolled with the IDP 225) for enrollment 215 of the first authenticator 220. The second authenticator 221 may be associated with the first characteristic. For example, the IDP 225 may determine that the second authenticator 221 may be capable of attesting the first characteristic. In some examples, the first characteristic may be an example of a hardware protected characteristic. In such examples, the second authenticator 221 may be capable of providing proof of possession and may therefore attest hardware protection. That is, because the second authenticator 221 may be capable of providing proof of possession, the IDP 225 may determine that the second authenticator 221 is capable of attesting the hardware protected characteristic (e.g., the first characteristic).

In some examples, during the initial enrollment 210, the IDP may obtain a request from the user 205 to enroll the first authenticator 220 for accessing a resource via the IDP 225. In such examples, the request may use the second authenticator 221 to authorize the request. That is, the request may use the second authenticator 221 for authorization 230 of the enrollment 215 of the first authenticator 220. In some examples, during the authorization 230, the IDP 225 may perform factor validation of the second authenticator 221. For example, the IDP 225 may validate the second authenticator 221 in response to receiving the request to enroll the first authenticator. Additionally, in response to validating the second authenticator 221, the IDP 225 may register the first authenticator 220 (e.g., may perform authenticator registration of the first authenticator 220 as part of the enrollment 215). The IDP 225 may track (e.g., internally or indirectly, such as part of an access token claim) attested characteristics 235 during the initial enrollment 210. For example, the IDP 225 may determine one or more characteristics (e.g., properties) attested by the second authenticator 221 during the authorization 230. In the example of FIG. 2, the IDP 225 may determine that the second authenticator 221 is capable of attesting (e.g., verifying) the first characteristic. Additionally, in some examples, the IDP 225 may determine that the first characteristic is common to the first authenticator 220 and the second authenticator 221. In such examples, the IDP 225 may enable the first authenticator 220 to attest the first characteristic for accessing the resource. For example, in response to enrolling the first authenticator 220, the IDP 225 may determine that the first characteristic is common to the first authenticator 220 and the second authenticator 221 (e.g., the authenticator used to authorize the enrollment of the first authenticator) and, as such, may enable the first authenticator 220 to attest the first characteristic. In other words, during the enrollment 215 of the first authenticator 220 with the IDP 225, the IDP 225 may assign the first characteristic to the first authenticator 220 based validating the second authenticator and based on the first characteristic being common to the second authenticator and the first authenticator. As illustrated in the example of FIG. 2, the IDP 225 may maintain an authenticator directory 250 (e.g., including an authenticator record) for the first authenticator 220. During the initial enrollment 210, and based on the attested characteristics 235 including the first characteristic, the authenticator directory may include (e.g., list) the first characteristic. In some examples, the IDP 225 may use the authenticator directory 250 to determine one or more (e.g., which) characteristics may have been confirmed (e.g., enabled for verification) for the first authenticator 220 for accessing the resource (or one or more other resources).

In some examples, in response to enrolling the first authenticator 220, the IDP 225 may downgrade an assurance level associated with the first authenticator 220. For example, the IDP 225 may assign a first assurance level to the first authenticator (e.g., the assurance level associated with the first characteristic), which may be relatively low compared to a threshold assurance level the first authenticator 220 may be capable of providing (e.g., an assurance level associated with the second characteristic). Accordingly, the IDP 225 (or the user 205) may determine that the first characteristic fails to satisfy the threshold. That is, the IDP 225 (or the user 205) may determine that the first assurance level associated with the first characteristic fails to satisfy the threshold assurance level for the first authenticator 220. In some examples, the threshold assurance level for the first authenticator 220 may correspond to (e.g., be the same as) a threshold assurance level used to access the resource. Accordingly, the first assurance level assigned to the first authenticator 220 in response to the initial enrollment 210 may be insufficient for accessing the resource.

In some examples, the second characteristic may be restored for the first authenticator 220 based on a restore action 245. The restore action 245 may be associated with one or more mechanisms. For example, the restore action 245 may include one or more actions taken by the user 205 (e.g., via a client device), an administrator associated with the resource, the IDP 225, or by one or more automated processes. In some examples, the restore action 245 may include the administrator manually (e.g., during a time instance in which the user 205 may be in an office associated with the administrator) confirming the identity of the user 205 (e.g., via the third authenticator), such that an integrity of the first authenticator 220 may be confirmed. In some other examples, such as examples in which the first authenticator 220 may be device bound (e.g., bound to the client device used by the user 205 to enroll the first authenticator 220), the restore action 245 may include the client device entering a company premises and the second characteristic (e.g., the phishing resistant property) may be restored (e.g., automatically) in response to the client device entering the company premises. For example, the client device entering the company premise may trigger (e.g., via geo-fencing) the IDP 225 to enable the first authenticator 220 to attest the second characteristic. In other words, the IDP 225 may assume that an attacker who may have enrolled an authenticator on a device (e.g., a client device the attacker may possess) through phishing credentials of the user 205 may be incapable of bypassing physical security thereby entering the company premises. Accordingly, in response to the client device entering the company premises, the IDP 225 may determine that the client device on which the first authenticator is enrolled satisfies a criterion and, accordingly, may validate the second characteristic.

In some other examples, the restore action may enable (e.g., allow) the IDP 225 to validate a third authenticator 222 (e.g., an authenticator previously enrolled with the IDP 225), which may be associated with the second characteristic. That is, the IDP 225 may validate the second characteristic based on authentication 240 (e.g., including factor validation) of the third authenticator 222 as part of the restore action 245. For example, the second authenticator 221 may include a PUSH notification on a first device (e.g., the client device used to enroll the first authenticator). For example, the user 205 (e.g., an end user) may enroll the first authenticator 220 (e.g., a phishing resistant authenticator) on the first device using a 2-factor authentication that includes a password and the PUSH notification (e.g., the second authenticator 221) received on the first device. In such an example, to enable the second characteristic (e.g., a phishing resistant characteristic) for the first authenticator 220, the user 205 may sign into a user account that the user 205 may have with the IDP 225 on a second device, which may have the third authenticator (e.g., a phishing resistant factor, such as a biometric sensor) enrolled. The user 205 (e.g., and the IDP 225) may validate the third authenticator 222 enrolled on the second device, which may restore (e.g., unlock) the second characteristic (e.g., the phishing resistant characteristic) for the first authenticator 220 on the first device.

In some examples, the second characteristic may include an inherence characteristic. Additionally, in some examples, enrolling inherence factors (e.g., authenticators capable of verifying inherence) may not include use of other inherence factors (e.g., for authorizing the enrollment). For example, while authentications using the inherence factors may have a relatively low likelihood of being spoofed, an attacker may obfuscate an inherence factor by the use of stolen credentials (e.g., credentials associated with the user 205) of other factor types (e.g., a password obtained via a phishing attach) to enroll another inherence factor. In such an example, the other inherence factor may be anchored to the attacker (e.g., a person different from the user 205) and accepted by the IDP 225. Accordingly, the IDP 225 may refrain from enabling the first authenticator 220 to verify the inherence characteristic (e.g., the second characteristic), for example until the inherence characteristic may be validated with another inherence factor (e.g., a trusted inherence factor), such as a previously enrolled authenticator capable of verifying inherence (e.g., the third authenticator 222).

In some other examples (e.g., rather than using an inherence factor previously enrolled by the user 205, such as the third authenticator 222), the user 205 may rely on another user (e.g., a co-worker) that may have trusted authenticators with the inherence characteristic enrolled. In such examples, the IDP 225 (e.g., or the resource, which may be an application) may validate the second characteristic based on validating a proximity of the user 205 and the other user. For example, the IDP 225 (or the application) may validate the proximity of the user and the other user (e.g., the co-worker) based on consent of the other user and a trusted authenticator (e.g., an inherence factor) enrolled by the other user. In other words, the first authenticator may be enrolled on a first device (e.g., the client device) associated with the user 205 and the third authenticator 222 may include an authenticator enrolled on a second device (e.g., another client device) associated with the other user (e.g., the co-worker). In such examples, validating the third authenticator 222 may be based on the proximity of the first device and the second device satisfying a threshold (e.g., based on a distance between the first device and the second device satisfying a threshold distance). In some other examples, validation of the second characteristic (e.g., via validation of the third authenticator) may come from out of band identity validation. That is, a first connection used by the IDP 225 to obtain the request to enroll the first authenticator may be different from a second connection used by the IDP 225 to obtain a second request to validate the third authenticator 222 (e.g., from the other user).

In some other examples, the second characteristic may include characteristics associated with possession factors (e.g., authenticators capable of verifying possession). That is, in some examples, the first authenticator may be an example of a possession factor. In such examples, an assurance level associated with the first authenticator 220 may be downgraded, such that the first authenticator 220 may be incapable of attesting (e.g., may not be enabled to verify) possession until possession is validated. In some examples, possession may be validated by a device on which the possession factor is enrolled being in a proximity of another possession factor that the user 205 may have and that may be trusted by the IDP 225. In some examples, by dynamically adjusting the characteristics of the first authenticator 220, the IDP 225 may provide for reduced security risks and increased flexibility associated with authenticator enrollment, among other possible benefits.

Figure 3A:
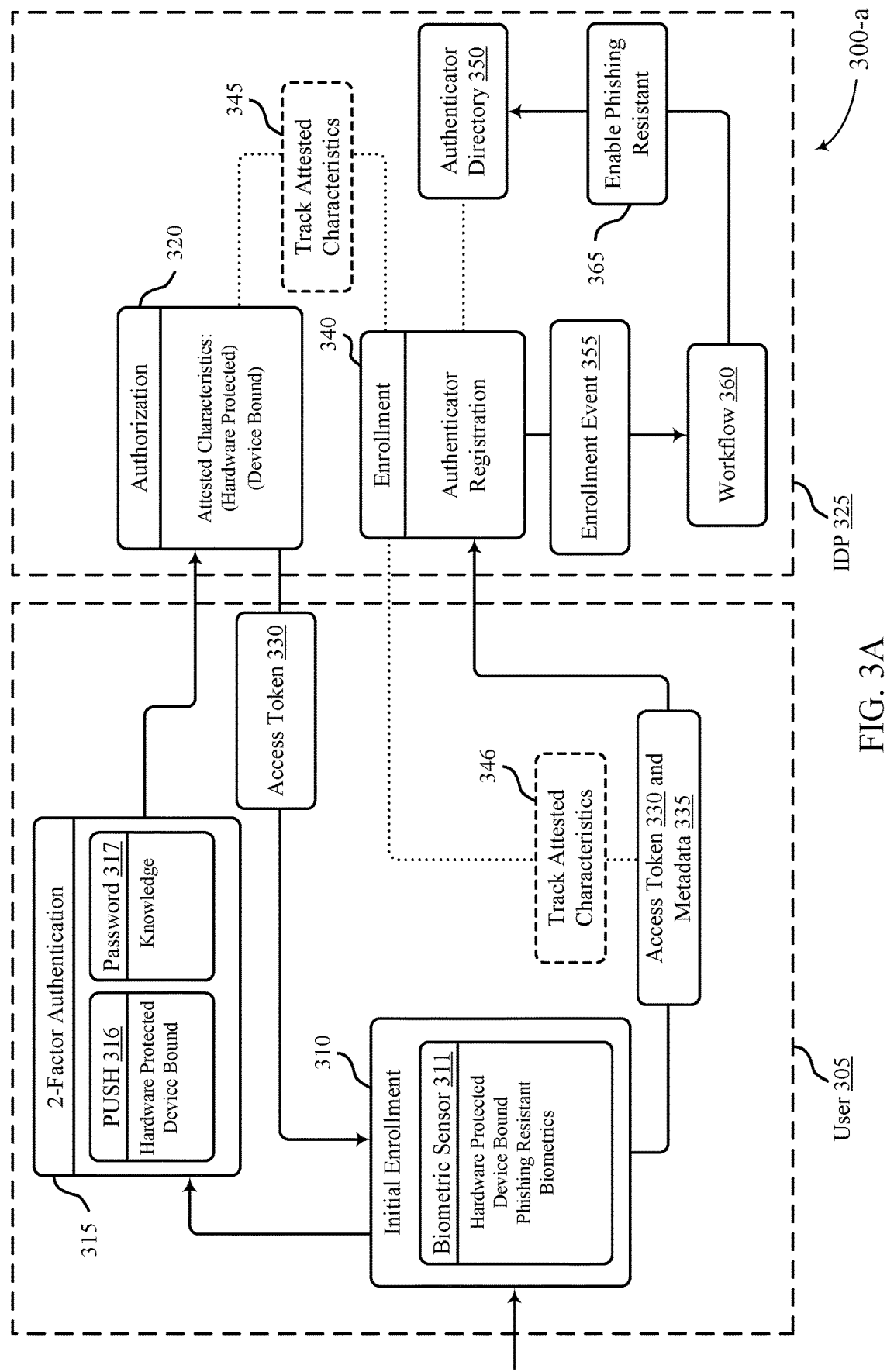
Figure 3B:
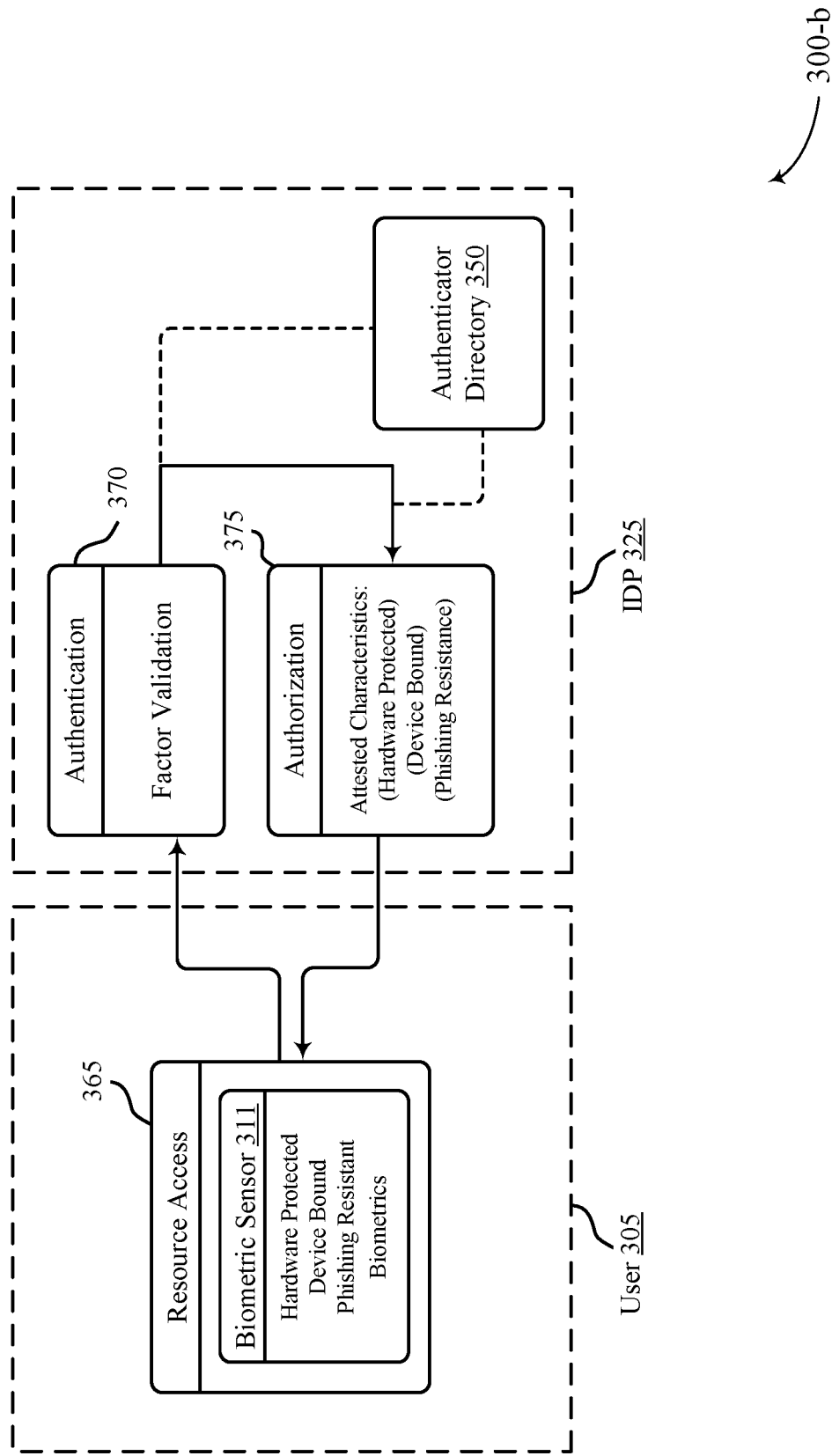

FIGS. 3A and 3B illustrate examples of procedures 300 that support techniques for dynamically adjusting authenticator assurance levels in accordance with aspects of the present disclosure. The procedures 300 (e.g., a procedure 300-a and a procedure 300-b) may implement or be implemented by aspects of the system 100 and the procedure 200. For example, one or more aspects of the procedures 300 may be implemented by a user 305 via a client device, which may be an example of a client device illustrated by and described with reference to FIGS. 1 and 2. Additionally, one or more aspects of the procedures 300 may be implemented by an IDP 325 (e.g., a software platform), which may be an example of an IDP as described with reference to FIGS. 1 and 2.

At 310, a user 305 may perform an initial enrollment via a client device to enroll a biometric sensor 311 with an IDP 325 on the client device. The initial enrollment may be an example of an initial enrollment 210 illustrated by an described with reference to FIG. 2. For example, during the initial enrollment at 310, the user 305 may transmit a request to enroll the biometric sensor 311 with the IDP 325 for accessing a resource. The biometric sensor 311 may be associated with multiple characteristics, including hardware protected, device bound, phishing resistant, and biometrics characteristics. In accordance with the initial enrollment at 310, the user 305 may use one or more authentication methods (e.g., and authenticators) for authorization of the enrollment of the biometric sensor 311.

For example, at 315 the user may perform 2-factor authentication for authorization of the enrollment of the biometric sensor 311. The 2-factor authentication may include a PUSH 316 (e.g., a PUSH notification received via the client device) and a password 317 (e.g., entered by the user via the client device). The password 317 may be capable of attesting knowledge and the PUSH 316 may be capable of attesting hardware protected and device bound characteristics.

At 320, the IDP 325 may perform authorization (e.g., including factor validation) of the enrollment of the biometric sensor 311, which may be based on the 2-factor authentication performed by the user 305 at 315. For example, as part of the authorization at 320, the IDP 325 may validate the PUSH 316 and the password 317. In response to validating the PUSH 316, the IDP 325 may provide an access token 330 to the user 305, which the user 305 may use to access the resource. In response to providing the access token 330 to the user 305, the IDP 325 may obtain the access token 330 and metadata 335 (e.g., the access token and public metadata) from the user 305 and, at 340, may perform enrollment (e.g., including authenticator registration). The IDP 325 may use the metadata 335 (e.g., additional enrollment metadata) to register the biometric sensor 311. In other words, the IDP 325 may authorize enrollment of (e.g., may enroll) the biometric sensor 311 in response to validating the PUSH 316 and the password 317.

In some examples, such as in response to successful enrollment of the biometric sensor 311, the IDP 325 may enable the biometric sensor 311 to attest (e.g., verify) one or more characteristics for accessing the resource. The characteristics that the IDP 325 may enable the biometric sensor 311 to attest may be based on one or more attested characteristics of the PUSH 316. In some examples, the IDP 325 may track characteristics that the PUSH 316 attested to during authorization of the enrollment of the biometric sensor 311. For example, at 345, the IDP 325 may track attested characteristics of the PUSH 316 (e.g., a possession factor) between the authorization at 320 and the enrollment at 340 (e.g., internally). Additionally, or alternatively, at 346, the IDP 325 may track attested characteristics of the PUSH 316 as part of the metadata 335 of the access token 330 issued as part of the authorization at 320 and returned to the IDP 325 to register the biometric sensor 311. In some examples, the IDP 325 may determine that the attested characteristics include hardware protected and device bound characteristics.

That is, the IDP may determine that the PUSH 316 (e.g., an authenticator that the IDP 325 may trust) may be capable of attesting hardware protected and device bound characteristics. The IDP 325 may compare the characteristics that the PUSH 316 attested during authorization of the enrollment of the biometric sensor 311 (e.g., the hardware protected and device bound characteristics) to the characteristics associated with the biometric sensor 311 (e.g., the hardware protected, device bound, phishing resistant, and biometrics characteristics). In the example of FIG. 3A, the IDP 325 may determine that hardware protected and device bound characteristics are common to both the PUSH 316 and the biometric sensor 311. Accordingly, the IDP 325 may enable the biometric sensor 311 to attest (e.g., verify) hardware protected and device bound characteristics for accessing the resource. In other words, the IDP 325 may match characteristics that the PUSH 316 possesses (e.g., and the IDP 325 trusts) with characteristics associated with the biometric sensor 311 and enable the biometric sensor 311 to attest the matched characteristics (e.g., in the future, such as for accessing the resource). The PUSH 316 may be incapable of attesting one or more other characteristics associated with the biometric sensor 311, such as the phishing resistant and biometrics characteristics. Accordingly, the IDP 325 may refrain from enabling the biometric sensor 311 to attest the phishing resistant and biometrics characteristics, for example until the IDP 325 may validate such characteristics for the biometric sensor 311. In other words, the IDP 325 may disable the phishing resistant and biometrics characteristics for the biometric sensor 311 subsequent to the enrollment of the biometric sensor 311 based on the PUSH 316 (e.g., the authenticator used for enrollment of the biometric sensor 311), being incapable of attesting the phishing resistant and biometrics characteristics. The IDP 325 may assign an assurance level (e.g., a downgraded assurance level) to the biometric sensor 311 based on the characteristics that are common to the PUSH 316 and the biometric sensor 311 (e.g., the characteristics that both the PUSH 316 and the biometric sensor 311 possess and that may be validated by the IDP 325). For example, the IDP 325 may assign assurance level to the biometric sensor 311 that may be based on the hardware protected and device bound characteristics. In other words, the assurance level may correspond to a subset of common properties (e.g., a lowest common denominator) that the biometric sensor 311 and the PUSH 316 possess and may be validated (e.g., trusted) by the IDP 325 (e.g., a service provider for the second authenticator).

The IDP 325 may maintain an authenticator record for the biometric sensor 311 using an authenticator directory 350. The authenticator directory 350 may be an example of an authenticator directory 250 illustrated by and described with reference to FIG. 2. For example, the authenticator record for the biometric sensor 311 may include (e.g., list) the characteristics that the IDP 325 enable the biometric sensor 311 to attest (e.g., confirmed characteristics, characteristics enabled for verification by the biometric sensor 311). As such, subsequent to (e.g., based on) the enrollment and registration of the biometric sensor 311, the authenticator record for the biometric sensor 311 may include the hardware protected and device bound characteristics.

In some examples, one or more disabled characteristics associated with the biometric sensor 311 may be restored for the biometric sensor 311 based on one or more actions taken by the user 305 (e.g., via the client device or another client device associated with the user 305), an administrator associated with the resource, or the IDP 225. Additionally, or alternatively, one or more disabled characteristics associated with the biometric sensor 311 may be restored for the biometric sensor 311 based on one or more automated processes. For example, one or more processes (e.g., separate from enrollment of the biometric sensor 311) may be used to attest (e.g., enable) characteristics of the biometric sensor 311 which may not have been attested (e.g., validated) during the enrollment at 340. The one or more processes may include a restore action illustrated by and described with reference to FIG. 2. For example, the one or more processes may include validation of a third authenticator, an automated workflow (e.g., based on signals collected during the authorization at 320), or a manual verification process, among other examples.

As illustrated in the example of FIG. 3A, the IDP 325 may identify an enrollment event 355 in response to the enrollment of the biometric sensor 311 at 340. The enrollment event 355 may trigger a workflow 360 (e.g., an automated workflow) to restore one or more disabled characteristics associated with the biometric sensor 311. In some examples, the workflow 360 may be determined at the IDP 325 or configured at the IDP 325, for example by the administrator of the resource. For instance, the IDP 325 may obtain an indication from the administrator that configures the IDP 325 to trigger the workflow 360 (or another type of restore action) that validates the one or more characteristics (e.g., one or more disabled characteristics, such as the phishing resistant characteristic) associated with the biometric sensor 311. In some examples, the workflow 360 may include the IDP 325 or the administrator of the resource determining that the client device (e.g., the device on which the biometric sensor 311 may be enrolled) satisfies a criterion. For example, the IDP 325 (or the administrator of the resource) may determine that the client device may be associated with a company (e.g., an organization) that the resource or the administrator of the resource (or both) may be associated with. That is, the IDP 325 may check that the client device is a company-owned device. Additionally, or alternatively, the IDP 325 (or the administrator of the resource) may determine that the request to enroll the biometric sensor 311 was communicated to the IDP 325 via a network associated with the company. In some examples, the workflow 360 may include the IDP 325 (or the administrator of the resource) determining that the client device entered a premises associated with the company (e.g., using geofencing). In some examples, the IDP 325 may determine that the client device satisfied the criterion based on an indication obtained from the administrator of the resource, who may determine that the client device satisfies the criterion.

In some examples, based on the workflow 360, the IDP 325 may determine to restore one or more disabled characteristics associated with the biometric sensor 311. The restored characteristics may be based characteristics validated via the workflow 360. For example, because the enrollment of the biometric sensor 311 used the PUSH 316, which may be sent to the client device, if the IDP 325 determines that the client device is associated with the company, the IDP 325 may also determine that an attacker fraudulently obtaining (e.g., phishing) credentials of the user 305 during the enrollment of the biometric sensor 311 may be relatively unlikely. For example, it may be relatively unlikely for the attacker to have access to a device associated with the company, therefore, obtaining the credentials of the user 305 may necessitate that the attacker stole the client device. Accordingly, the IDP 325 may validate the phishing resistant characteristic based on the IDP 325 determining that the client device is associated with the company (e.g., via the workflow 360). At 365, and in response to validating the phishing resistant characteristic via the workflow 360, the IDP 325 may enable the biometric sensor 311 to attest the phishing resistant characteristic. That is, the IDP 325 may enable the biometric sensor 311 to attest the phishing resistant characteristic based on validating the phishing resistant characteristic via the workflow 360.

The IDP 325 may update the assurance level assigned to the biometric sensor 311 (e.g., to an upgraded assurance level) based on restoring the phishing resistant characteristic to the biometric sensor 311. For example, the IDP 325 may update the assurance level associated to the biometric sensor 311 such that the assurance level may be based on the characteristics verified during enrollment (e.g., the hardware protected characteristic and the device bound characteristic) and the characteristic verified via the workflow 360 (e.g., the phishing resistant characteristic).

As illustrated in the example of FIG. 3B, the IDP 325 may update the authenticator record for the biometric sensor 311 in the authenticator directory 350. For example, updated authenticator record for the biometric sensor 311 may include the hardware protected, device bound, and phishing resistant characteristics based on the IDP 325 validating the phishing resistant characteristic via the workflow 360.

In some examples, at 365, the user 305 may use the biometric sensor 311 for a resource access procedure (e.g., for accessing the resource). That is, the user 305 may use the biometric sensor 311 to request access to the resource via the client device. In other words, the user 305 may request to access the resource and the request may use the biometric sensor 311 to authorize access to the resource. At 370, the IDP 325 may perform authentication (e.g., including factor validation) of the biometric sensor 311 in response to obtaining the request to access the resource.

In some examples, the IDP 325 may determine that the updated assurance level associated with the biometric sensor 311 satisfies a threshold assurance level associated with the resource. For example, during authorization at 375 (e.g., and in response to receiving the request to access the resource from the user 305 via the client device) the IDP 325 may use the authenticator directory 350 to confirm attested characteristics associated with the biometric sensor 311 (e.g., characteristics that the biometric sensor 311 is capable of attesting). The IDP 325 may determine whether the attested characteristics, and therefore the assurance level associated with the biometric sensor 311, satisfy the threshold assurance level associated with the resource. In some examples, the IDP 325 may determine that the assurance level associated with the biometric sensor 311 satisfies the threshold assurance level associated with the resource. In such examples, and based on validating the biometric sensor 311

(e.g., based on successful factor validation), the IDP 325 may authorize access to the resource for the user 305.

Figure 4A:
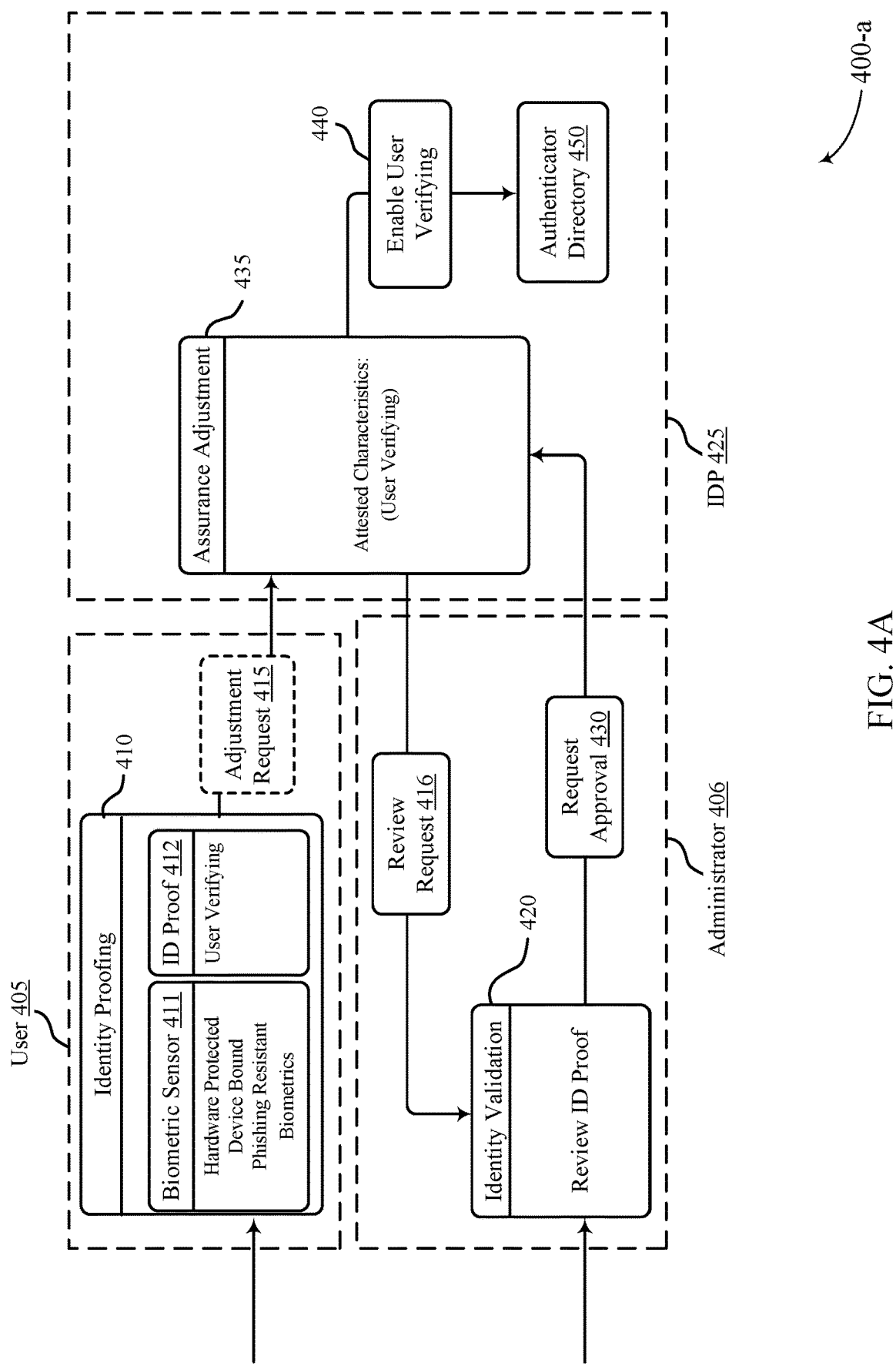
Figure 4B:
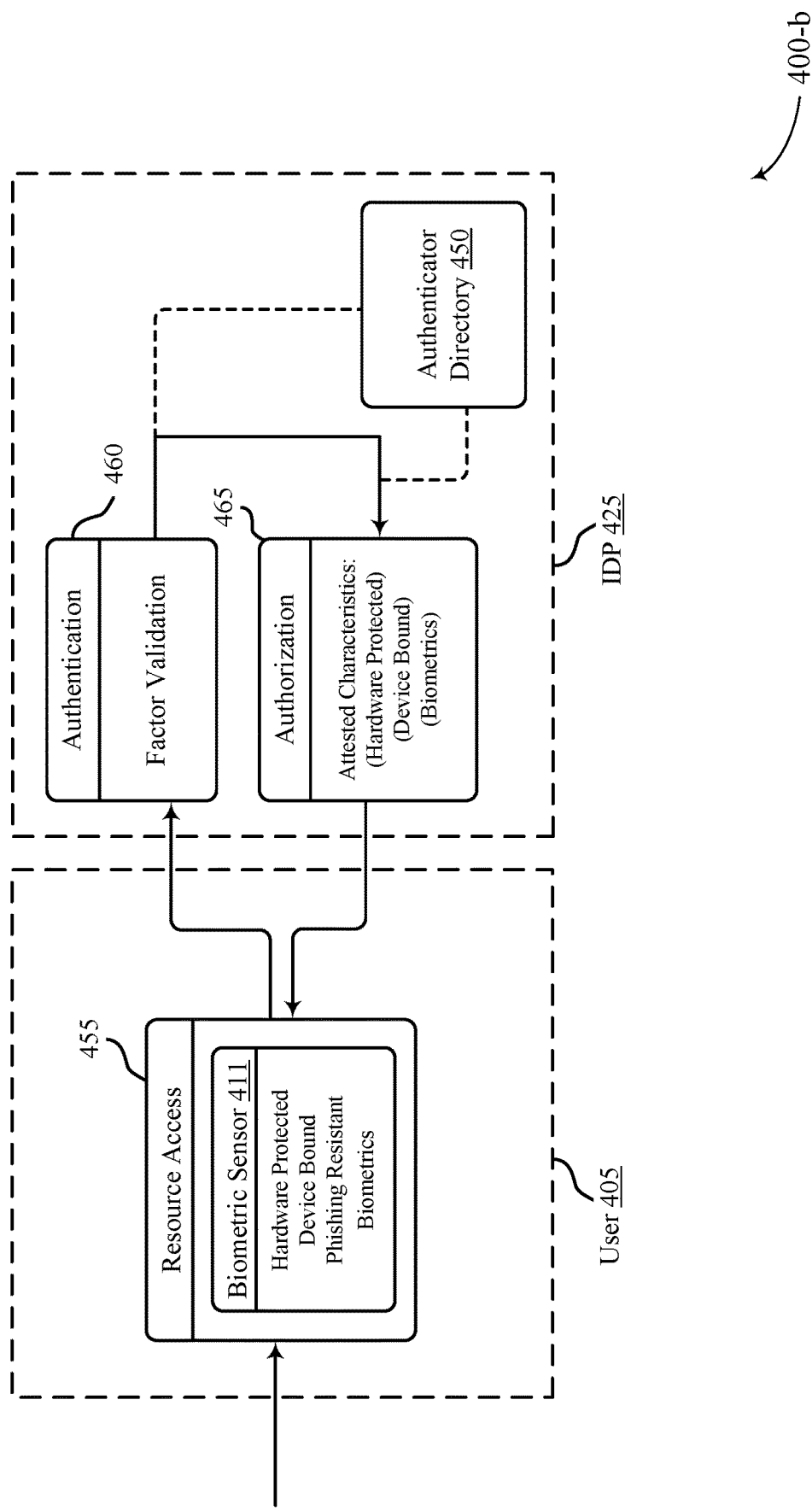

FIGS. 4A and 4B illustrate examples of procedures 400 that support techniques for dynamically adjusting authenticator assurance levels in accordance with aspects of the present disclosure. The procedures 400 (e.g., a procedure 400-*a* and a procedure 400-*b*) may implement or be implemented by aspects of the system 100, the procedure 200, and the procedures 300. For example, one or more aspects of the procedures 400 may be implemented by a user 405 via a client device, which may be an example of a client device illustrated by and described with reference to FIGS. 1, 2, 3A, and 3B. Additionally, one or more aspects of the procedures 400 may be implemented by an IDP 425 (e.g., a software platform), which may be an example of an IDP as described with reference to FIGS. 1, 2, 3A, and 3B.

At 410, the user 405 may perform an initial enrollment via a client device to enroll a biometric sensor 411 with an IDP 425 on the client device. The initial enrollment may be an example of an initial enrollment illustrated by and described with reference to FIGS. 2 and 3A. For example, during the initial enrollment, the user 405 may transmit a request to enroll the biometric sensor 411 with the IDP 425 for accessing a resource. The biometric sensor 411 may be associated with multiple characteristics, including hardware protected, device bound, phishing resistant, and biometrics characteristics. The user 405 may use one or more authenticator methods (e.g., and authenticators) for authorization of the enrollment of the biometric sensor 411. For example, the user 405 may perform 2-factor authentication for authorization of the enrollment of the biometric sensor 411. The 2-factor authentication may include a PUSH notification being received via the client device and a password being entered by the user 405 via the client device. The PUSH notification may be capable of attesting hardware protected and device bound. The IDP 425 may authorize enrollment of the biometric sensor 411 in response to validating the PUSH notification and the password. The IDP 425 may determine that the PUSH notification is capable of attesting hardware protected and device bound characteristics and, accordingly, may enable the biometric sensor 411 to attest the hardware protected and device bound characteristic for accessing the resource.

The PUSH notification, however, may be incapable of attesting one or more other characteristics associated with the biometric sensor 411, such as phishing resistant and biometrics characteristics. Accordingly, the IDP 425 may refrain from enabling the biometric sensor 411 to attest the phishing resistant and biometrics characteristics, for example until the IDP 425 may validate such characteristics for the biometric sensor 411. Accordingly, based on the enrollment of the biometric sensor 411, the IDP 425 may disable the phishing resistant and biometrics characteristics for the IDP 425. The IDP 425 may assign an assurance level to the biometric sensor 411 that may be based on the hardware protected and device bound characteristics. The IDP 425 may maintain an authenticator record for the biometric sensor 411 using an authenticator directory 450. The authenticator record for the biometric sensor 411 may include the characteristics that the IDP 425 enabled the biometric sensor 411 to attest. Accordingly, subsequent to the enrollment and registration of the biometric sensor 411, the authenticator record for the biometric sensor 411 may include the hardware protected and device bound characteristics.

In some examples, one or more of the disabled characteristics associated with the biometric sensor 411 may be restored for the biometric sensor 411 based on one or more actions taken by the user 405, an administrator 406 that may be associated with the resource, the IDP 425, one or more automated processes, or any combination thereof. For example, one or more processes may be used to enable characteristics of the biometric sensor 411 that may not have been attested during the enrollment. The one or more processes may include a restore action illustrated by and described with reference to FIGS. 1, 2, and 3A. For example, the one or more processes may include validation of a third authenticator, an automated workflow (e.g., based on signals collected during authorization of the enrollment of the biometric sensor 411), or a manual verification process, among other examples.

As illustrated in the example of FIG. 4A, the user 405 may perform an action to attest (e.g., prove, confirm, validate) and identity of the user 405. For example, at 410, the user may perform identity proofing using ID proof 412. The ID proof 412 may include an ID card (e.g., a driver's license, a company ID) or another means of attesting the identity of the user 405, such as a video call with or recording of the user 405. In some examples, such as part of the identity proofing at 410, the user 405 may output an adjustment request 415 to the IDP 425. For example, user 405 may use the adjustment request 415 to request that the IDP 425 adjust the assurance level associated with the biometric sensor 411 based on the ID proof 412.

At 435, the IDP 425 may perform an assurance adjustment (e.g., including factor validation) in which the IDP 425 may adjust the assurance level assigned for the biometric sensor 411 based on validating the ID proof 412. For example, as part of the identity proofing at 410, the user 405 (e.g., via the adjustment request 415) or the administrator 406 may request that the IDP 425 adjust the assurance level assigned to the biometric sensor 411 based on validating the ID proof 412. In some examples, validating the ID proof 412 may be based on approval by the administrator 406. For example, as part of the assurance adjustment at 435, the IDP 425 may output a review request 416 to the administrator 406. In other words, the IDP 425 may use the review request 416 to request that the administrator 406 review proof of identity for the user 405. In some examples, the review request 416 may indicate (e.g., provide) the ID proof 412 to the administrator 406 for validation. In some other examples, the review request 416 may include the IDP 425 facilitating the user 405 providing (e.g., directly) the ID proof 412 to the administrator 406 (or an associated third party) for validation.

At 420, the administrator 406 may perform identity validation. For example, in response to receiving the review request 416, the administrator 406 (or the associated third party) may review evidence of the identity of the user 405 (e.g., the ID proof 412). The administrator 406 may validate the ID proof 412 based on the review of the ID proof 412.

In some examples, the administrator 406 may approve the adjustment request 415 based on validating the ID proof 412. For example, the administrator 406 may output a request approval 430 to the IDP 425. In other words, in response to validating the ID proof 412 at 420, the administrator 406 may approve the adjustment of the assurance level assigned to the biometric sensor 411.

The IDP 425 may adjust the assurance level (e.g., to an upgraded assurance level) assigned to the biometric sensor 411 based on validating of the ID proof 412. For example, in response to the administrator 406 validating the ID proof 412, the IDP 425 may determine that the identity of the user 405 has been verified. Accordingly, the IDP 425 may determine that the biometric sensor 411 may be capable of attesting a user verifying characteristic.

At 440, the IDP 425 may enable the biometric sensor 411 to attest (e.g., verify) the user verifying characteristic. The user verifying characteristic may include one or more inherence characteristics, such as biometrics. For example, the IDP 425 may determine that the biometric sensor 411 is associated with biometrics, which may be an example of a user verifying characteristic. Accordingly, the IDP 425 may enable the biometric sensor 411 to attest biometrics characteristics for accessing the resource. In other words, based on validation of the ID proof 412, the IDP 425 may restore the biometrics characteristic to the biometric sensor 411. As such, the IDP 425 may update the assurance level associated to the biometric sensor 411 such that the assurance level may be based on the characteristics verified during enrollment (e.g., the hardware protected and device bound characteristics) and the characteristics verified via the identity proofing (e.g., the biometrics characteristic).

As illustrated in the example of FIG. 4B, the IDP 425 may update the authenticator record for the biometric sensor 411 in the authenticator directory 450. For example, updated authenticator record for the biometric sensor 411 may include the hardware protected, device bound, and biometrics characteristics based on the IDP 425 validating the identity of the user 405 (e.g., validating the user verifying characteristic) via the identity proofing.

In some examples, at 455, the user 405 may use the biometric sensor 411 for a resource access procedure (e.g., for accessing the resource). That is, the user 405 may use the biometric sensor 411 to request access to the resource via the client device. In other words, the user 405 may request to access the resource and the request may use the biometric sensor 411 to authorize access to the resource for the user 405. At 460, the IDP 425 may perform authentication (e.g., including factor validation) of the biometric sensor 411, for example in response to obtaining the request to access the resource.

In some examples, the IDP 425 may determine that the updated assurance level associated with the biometric sensor 411 satisfies a threshold assurance level associated with the resource. For example, during authorization at 465 (e.g., and in response to receiving the request to access the resource from the user 405 via the client device) the IDP 425 may use the authenticator directory 450 to confirm attested characteristics associated with the biometric sensor 411 (e.g., characteristics that the biometric sensor 411 is capable of attesting). The IDP 425 may determine whether the attested characteristics, and therefore the assurance level associated with the biometric sensor 411, satisfy a threshold assurance level associated with the resource. In some examples, the IDP 425 may determine that the assurance level associated with the biometric sensor 411 satisfies the threshold assurance level associated with the resource. In such examples, at 465 and based on validating the biometric sensor 411 (e.g., based on successful factor validation), the IDP 425 may authorize access to the resource for the user 405.

In some examples, by dynamically adjusting the assurance level associated with the biometric sensor 411, the IDP 425 may provide increased authenticator enrollment flexibility for the user 405 and increased security of the resource for the administrator 406. For example, dynamically adjust assurance levels for authenticators, as described herein, may enable the user 405 to enroll an authenticator (e.g., the biometric sensor 411) without necessitating that multiple (e.g., all) characteristics associated with the authenticator be attested (e.g., verified, validated) during enrollment. Accordingly, some properties that may be relatively difficult to attest during enrollment may instead be attested (e.g., validated) via one or more other (e.g., subsequent) processes, such as via the identity proofing at 410, thereby providing a more flexible enrollment process, among other benefits.

Figure 5:
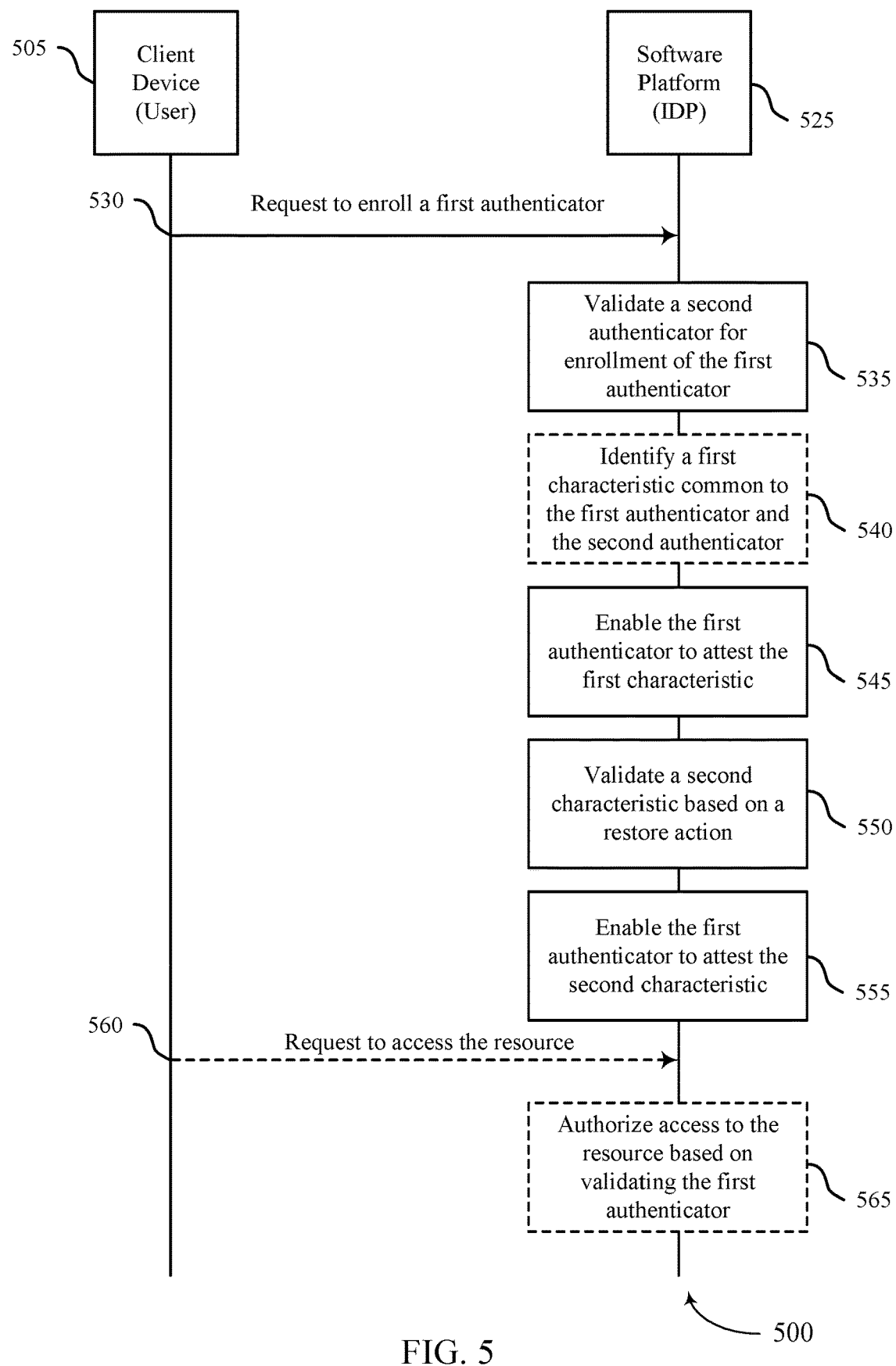
FIG. 5 illustrates an example of a process flow that supports techniques for dynamically adjusting authenticator assurance levels in accordance with aspects of the present disclosure.

FIG. 5 illustrates an example of a process flow 500 that supports techniques for dynamically adjusting authenticator assurance levels in accordance with aspects of the present disclosure. The process flow 500 may implement or be implemented by aspects of the system 100, the procedure 200, the procedures 300, and the procedures 400. For example, one or more aspects of the process flow 500 may be implemented by a client device 505 (e.g., a user), which may be an example of a client device illustrated by and described with reference to FIGS. 1, 2, 3A, 3B, 4A, and 4B. Additionally, one or more aspects of the process flow 500 may be implemented by a software platform 525 (e.g., an IDP), which may be an example of a software platform (e.g., an IDP) illustrated by and described with reference to FIGS. 1, 2, 3A, 3B, 4A, and 4B. In the following description of the process flow 500, the information communicated between the client device 505 and the software platform 525 may be performed in different orders or at different times than shown. Additionally, or alternatively, some operations may be omitted from the process flow 500 and other operations may be added to the process flow 500. The process flow 500 may provide for improved management of authenticator assurance levels at the software platform 525, among other possible benefits.

At 530, the software platform 525 (e.g., the IDP) may obtain a request from the client device 505 (e.g., the user) to enroll a first authenticator for accessing a resource via the software platform 525. In some examples, the request may use a second authenticator to authorize enrollment of the first authenticator. The first authenticator and the second authenticator may be examples of authenticator as described throughout the present disclosure. For example, the first authenticator and the second authenticator may each be associated with one or more characteristics.

At 535, in response to the enrollment request obtained at 530, the software platform 525 may validate the second authenticator for enrollment of the first authenticator. For example, the software platform 525 may use factor validation to validate the second authenticator. The factor validation may be an example of factor validation as describe throughout the present disclosure, including with reference to FIGS. 3A, 3B, 4A, and 4B. For example, in response to successfully validating the second authenticator, the software platform 525 may authorize enrollment of the first authenticator.

In some examples, at 540, the software platform 525 may identify a first characteristic that is common to the first authenticator and the second authenticator. For example, during authorization of the first authenticator using the second authenticator, the software platform 525 may determine that the second authenticator is capable of attesting the first characteristic and that the first characteristics is associated with the first authenticator.

At 545, the software platform 525 may enable the first authenticator to attest the first characteristic. For example, in response to successfully validating the second authenticator and based on the first characteristic being common to the first authenticator and the second authenticator, the software platform 525 may enable the first authenticator to attest the first characteristic.

At 550, the software platform 525 may validate a second characteristic associated with the first authenticator based on one or more actions. The one or more actions may be an example of a restore action as described throughout the present disclosure including with reference to FIGS. 1, 2, 3A, and 4A. For example, the one or more actions may be performed subsequent to enrollment of the first authenticator. Additionally, in some examples, the one or more actions may include one or more actions taken by the user (e.g., via the client device 505), an administrator of the resource, or the software platform 525. Additionally, or alternatively, the one or more actions may include one or more automated processes.

At 555, the software platform 525 may enable the first authenticator to attest the second characteristic associated with the first authenticator based on the action that validates the second characteristic. Additionally, the software platform 525 may adjust an assurance level assigned to the first authenticator from a first assurance level based on the first characteristic to a second assurance level (e.g., an upgraded assurance level) based on the second characteristic.

In some examples, at 560, the software platform 525 may obtain a request to access the resource from the user via the client device 505. The request may be an example of a resource access request as described throughout the present disclosure including with reference to FIGS. 3B and 4B. For example, the request may use the first authenticator to authorize access to the resource.

In some examples, at 565, the software platform 525 may authorize access to the resource for the user based on validating the first authenticator. For example, the software platform 525 may determine that the adjusted assurance level associated with the first authenticator satisfies a threshold assurance level associated with the resource. In some examples, by dynamically adjusting the assurance level associated with the first authenticator, the software platform 525 may increase a flexibility associated with enrollment of the first authenticator and increase security associated with accessing the resource, among other possible benefits.

Figure 6:
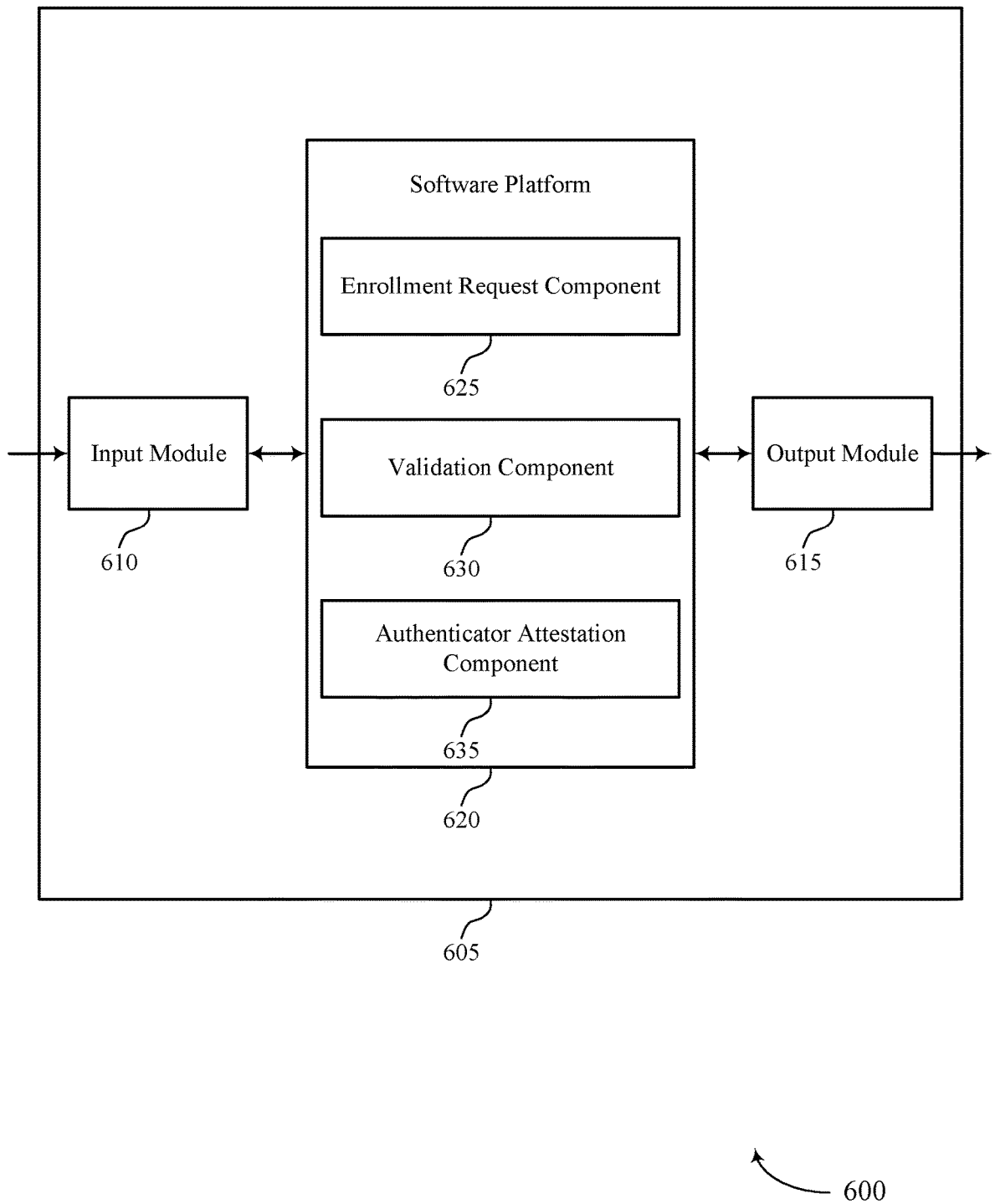
FIG. 6 illustrates a block diagram of an apparatus that supports techniques for dynamically adjusting authenticator assurance levels in accordance with aspects of the present disclosure.

FIG. 6 illustrates a block diagram 600 of a device 605 that supports techniques for dynamically adjusting authenticator assurance levels in accordance with aspects of the present disclosure. The device 605 may include an input module 610, an output module 615, and a software platform 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the software platform 620 to support techniques for dynamically adjusting authenticator assurance levels. In some cases, the input module 610 may be a component of an I/O controller 810 as described with reference to FIG. 8.

The output module 615 may manage output signals for the device 605. For example, the output module 615 may receive signals from other components of the device 605, such as the software platform 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the software platform 620 may include an enrollment request component 625, a validation component 630, an authenticator attestation component 635, or any combination thereof. In some examples, the software platform 620, or various components thereof, may be configured to perform various operations (e.g., receiving, monitoring, transmitting) using or otherwise in cooperation with the input module 610, the output module 615, or both. For example, the software platform 620 may receive information from the input module 610, send information to the output module 615, or be integrated in combination with the input module 610, the output module 615, or both to receive information, transmit information, or perform various other operations as described herein.

The software platform 620 may support managing assurance levels at a first device in accordance with examples as disclosed herein. The enrollment request component 625 may be configured to support obtaining, at a software platform of the first device, a request to enroll a first authenticator for accessing a resource via the software platform, where the request uses a second authenticator to authorize enrollment of the first authenticator. The validation component 630 may be configured to support validating the second authenticator in response to the request. The authenticator attestation component 635 may be configured to support enabling the first authenticator to attest a first characteristic of a set of multiple characteristics associated with the first authenticator in response to validating the second authenticator, where the first authenticator is enabled to attest the first characteristic based on the first characteristic being common to the first authenticator and the second authenticator. The authenticator attestation component 635 may be configured to support enabling the first authenticator to attest a second characteristic of the set of multiple characteristics associated with the first authenticator based on an action that validates the second characteristic.

Figure 7:
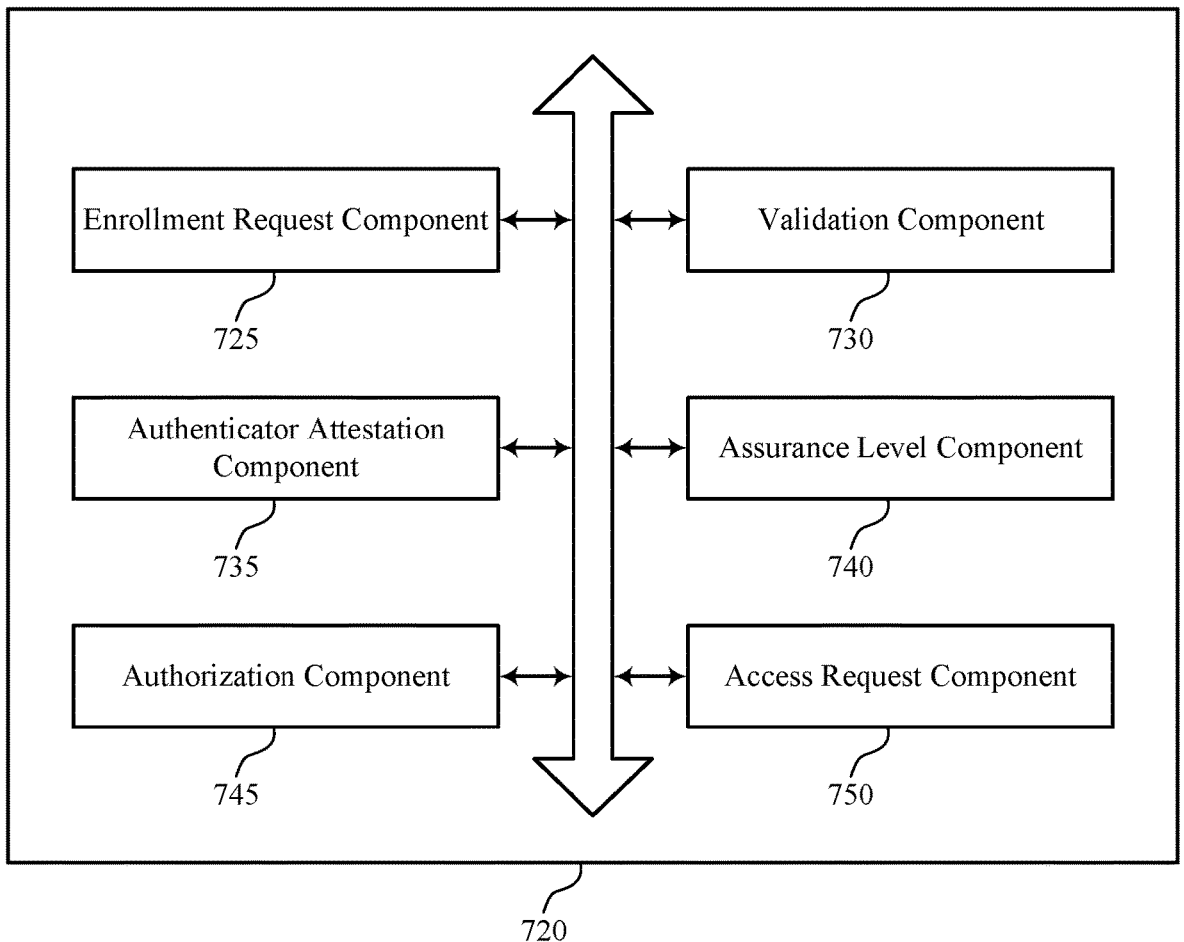
FIG. 7 illustrates a block diagram of a software platform that supports techniques for dynamically adjusting authenticator assurance levels in accordance with aspects of the present disclosure.

FIG. 7 illustrates a block diagram 700 of a software platform 720 that supports techniques for dynamically adjusting authenticator assurance levels in accordance with aspects of the present disclosure. The software platform 720 may be an example of aspects of a software platform or a software platform 620, or both, as described herein. The software platform 720, or various components thereof, may be an example of means for performing various aspects of techniques for dynamically adjusting authenticator assurance levels as described herein. For example, the software platform 720 may include an enrollment request component 725, a validation component 730, an authenticator attestation component 735, an assurance level component 740, an authorization component 745, an access request component 750, or any combination thereof. Each of these components may communicate, directly or indirectly, with one another (e.g., via one or more buses).

The software platform 720 may support managing assurance levels at a first device in accordance with examples as disclosed herein. The enrollment request component 725 may be configured to support obtaining, at a software platform of the first device, a request to enroll a first authenticator for accessing a resource via the software platform, where the request uses a second authenticator to authorize enrollment of the first authenticator. The validation component 730 may be configured to support validating the second authenticator in response to the request. The authenticator attestation component 735 may be configured to support enabling the first authenticator to attest a first characteristic of a set of multiple characteristics associated with the first authenticator in response to validating the second authenticator, where the first authenticator is enabled to attest the first characteristic based on the first characteristic being common to the first authenticator and the second authenticator. In some examples, the authenticator attestation component 735 may be configured to support enabling the first authenticator to attest a second characteristic of the set of multiple characteristics associated with the first authenticator based on an action that validates the second characteristic.

In some examples, the assurance level component 740 may be configured to support determining an assurance level associated with the first authenticator in accordance with the first characteristic that is common to the first authenticator and the second authenticator. In some examples, the assurance level component 740 may be configured to support updating the assurance level associated with the first authenticator based on validating the second characteristic, where the assurance level is updated in accordance with the second characteristic.

In some examples, the authorization component 745 may be configured to support authorizing enrollment of the first authenticator in response to the request and based on validating the second authenticator, where enabling the first authenticator to attest the first characteristic is based on the enrollment of the first authenticator.

In some examples, to support action that validates the second characteristic, the validation component 730 may be configured to support validating a third authenticator associated with the second characteristic in response to the enrollment of the first authenticator. In some examples, the validation component 730 may be configured to support obtaining an indication that configures the software platform to trigger the action that validates the second characteristic in response to the enrollment of the first authenticator.

In some examples, the request is obtained from a second device, and the validation component 730 may be configured to support obtaining a second request from a third device to validate a third authenticator associated with the second characteristic, where the third authenticator is enrolled on the third device, and where the action that validates the second characteristic includes validating the third authenticator.

In some examples, the second device and the third device are associated with a same user. In some examples, validating the third authenticator is based on a distance between the second device and the third device satisfying a threshold distance.

In some examples, the second device is associated with a first user and the third device is associated with a second user. In some examples, validating the third authenticator is based on a distance between the first user and the second user satisfying a threshold distance. In some examples, a first connection used to obtain the request is different from a second connection used to obtain the second request.

In some examples, to support action that validates the second characteristic, the validation component 730 may be configured to support obtaining an indication that the second device satisfies a criterion. In some examples, the access request component 750 may be configured to support obtaining a second request to access the resource, where the second request uses the first authenticator to authorize access to the resource. In some examples, the validation component 730 may be configured to support validating the first authenticator in response to receiving the second request. In some examples, the authorization component 745 may be configured to support authorizing access to the resource in response to validating the first authenticator and based on the first authenticator being enabled to attest the first characteristic and the second characteristic. In some examples, the software platform includes an IDP.

Figure 8:
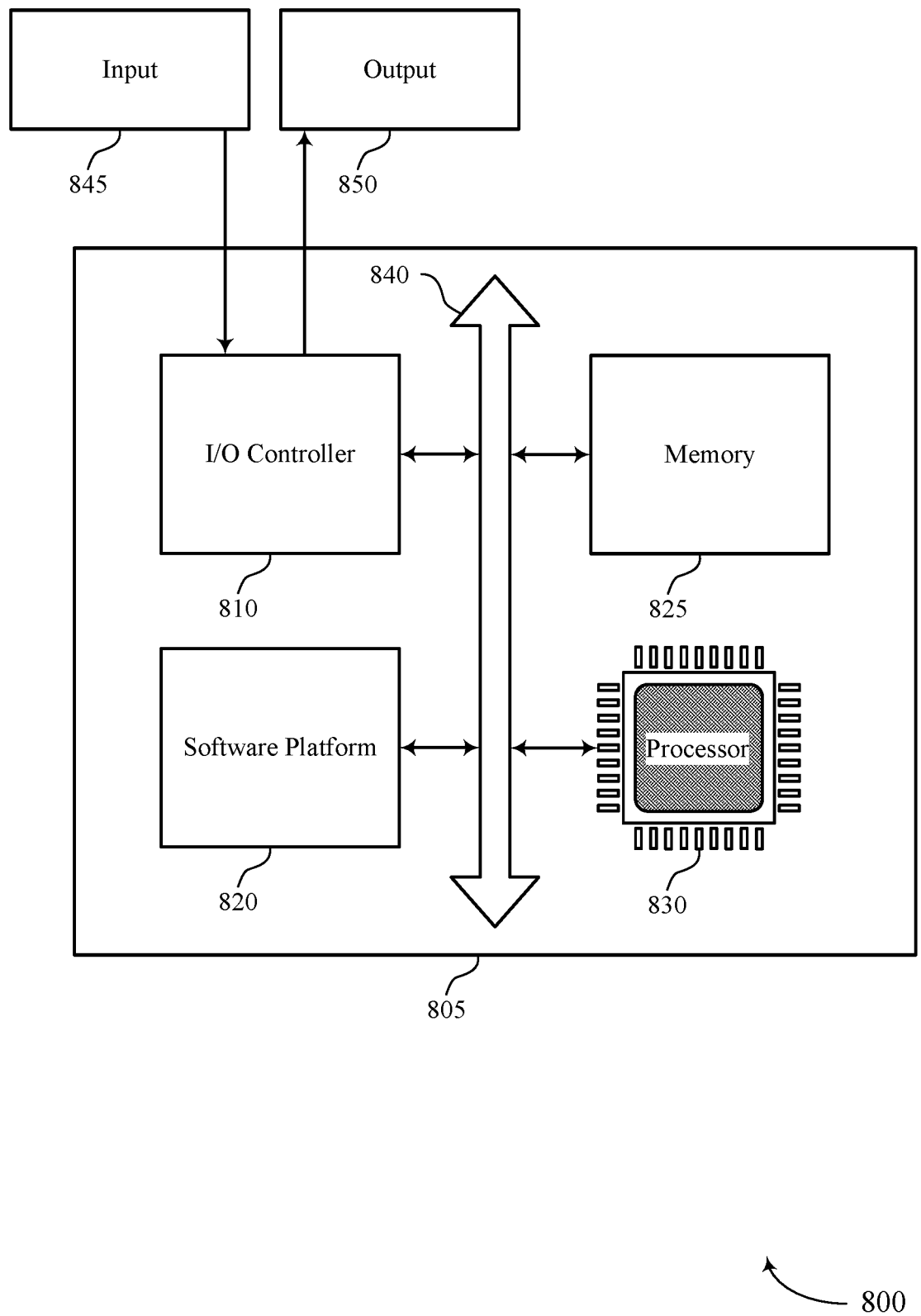
FIG. 8 illustrates a diagram of a system including a device that supports techniques for dynamically adjusting authenticator assurance levels in accordance with aspects of the present disclosure.

FIG. 8 illustrates a diagram of a system 800 including a device 805 that supports techniques for dynamically adjusting authenticator assurance levels in accordance with aspects of the present disclosure. The device 805 may be an example of or include the components of a device 605 as described herein. The device 805 may include components for bi-directional data communications including components for transmitting and receiving communications, such as a software platform 820, an I/O controller 810, a memory 825, and a processor 830. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The processor 830 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting techniques for dynamically adjusting authenticator assurance levels).

The software platform 820 may support managing assurance levels at a first device in accordance with examples as disclosed herein. For example, the software platform 820 may be configured to support obtaining, at a software platform of the first device, a request to enroll a first authenticator for accessing a resource via the software platform, where the request uses a second authenticator to authorize enrollment of the first authenticator. The software platform 820 may be configured to support validating the second authenticator in response to the request. The software platform 820 may be configured to support enabling the first authenticator to attest a first characteristic of a set of multiple characteristics associated with the first authenticator in response to validating the second authenticator, where the first authenticator is enabled to attest the first characteristic based on the first characteristic being common to the first authenticator and the second authenticator. The software platform 820 may be configured to support enabling the first authenticator to attest a second characteristic of the set of multiple characteristics associated with the first authenticator based on an action that validates the second characteristic.

By including or configuring the software platform 820 in accordance with examples as described herein, the device 805 may support techniques for improved communication reliability, reduced latency, and improved utilization of processing capability, among other possible benefits.

Figure 9:
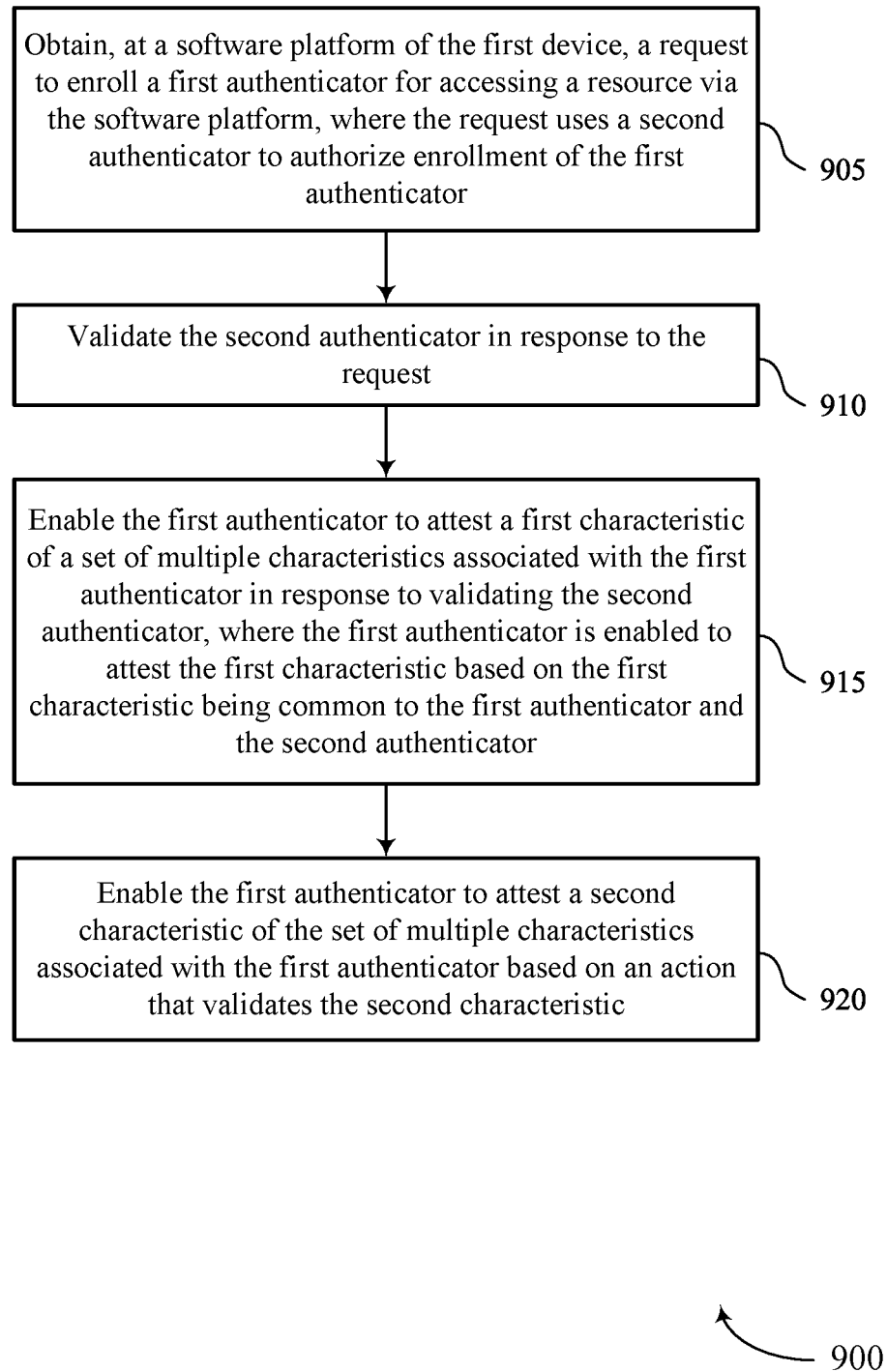
FIGS. 9 and 10 illustrate flowcharts showing methods that support techniques for dynamically adjusting authenticator assurance levels in accordance with aspects of the present disclosure.

FIG. 9 illustrates a flowchart showing a method 900 that supports techniques for dynamically adjusting authenticator assurance levels in accordance with aspects of the present disclosure. The operations of the method 900 may be implemented by a device or its components as described herein. For example, the operations of the method 900 may be performed by a device as described with reference to FIGS. 1 through 8. In some examples, a device may execute a set of instructions to control the functional elements of the device to perform the described functions. Additionally, or alternatively, the device may perform aspects of the described functions using special-purpose hardware.

At 905, the method may include obtaining, at a software platform of the first device, a request to enroll a first authenticator for accessing a resource via the software platform, where the request uses a second authenticator to authorize enrollment of the first authenticator. The operations of 905 may be performed in accordance with examples as disclosed herein. In some examples, aspects of the operations of 905 may be performed by an enrollment request component 725 as described with reference to FIG. 7.

At 910, the method may include validating the second authenticator in response to the request. The operations of 910 may be performed in accordance with examples as disclosed herein. In some examples, aspects of the operations of 910 may be performed by a validation component 730 as described with reference to FIG. 7.

At 915, the method may include enabling the first authenticator to attest a first characteristic of a set of multiple characteristics associated with the first authenticator in response to validating the second authenticator, where the first authenticator is enabled to attest the first characteristic based on the first characteristic being common to the first authenticator and the second authenticator. The operations of 915 may be performed in accordance with examples as disclosed herein. In some examples, aspects of the operations of 915 may be performed by an authenticator attestation component 735 as described with reference to FIG. 7.

At 920, the method may include enabling the first authenticator to attest a second characteristic of the set of multiple characteristics associated with the first authenticator based on an action that validates the second characteristic. The operations of 920 may be performed in accordance with examples as disclosed herein. In some examples, aspects of the operations of 920 may be performed by an authenticator attestation component 735 as described with reference to FIG. 7.

Figure 10:
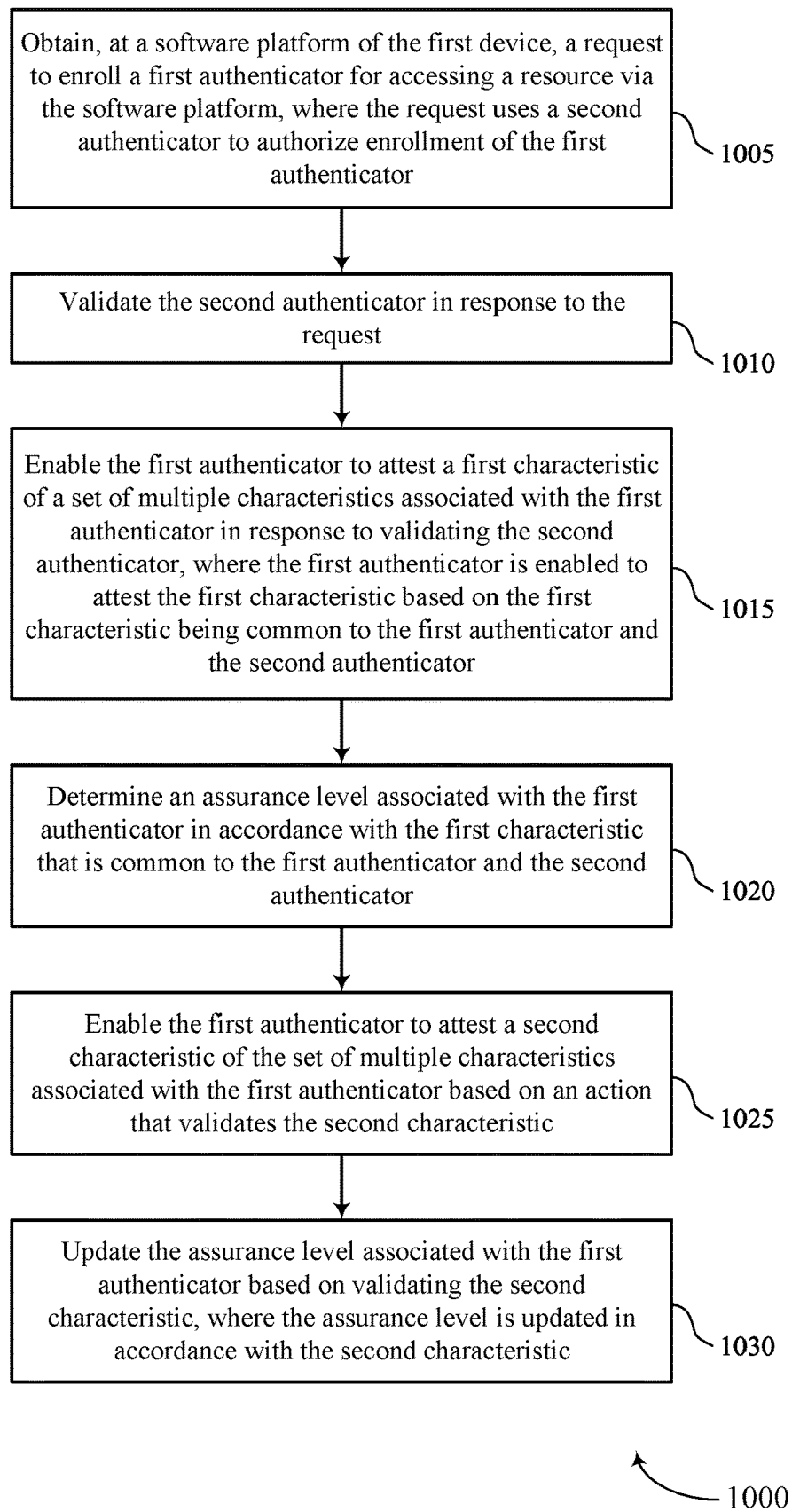

FIG. 10 illustrates a flowchart showing a method 1000 that supports techniques for dynamically adjusting authenticator assurance levels in accordance with aspects of the present disclosure. The operations of the method 1000 may be implemented by a device or its components as described herein. For example, the operations of the method 1000 may be performed by a device as described with reference to FIGS. 1 through 8. In some examples, a device may execute a set of instructions to control the functional elements of the device to perform the described functions. Additionally, or alternatively, the device may perform aspects of the described functions using special-purpose hardware.

At 1005, the method may include obtaining, at a software platform of the first device, a request to enroll a first authenticator for accessing a resource via the software platform, where the request uses a second authenticator to authorize enrollment of the first authenticator. The operations of 1005 may be performed in accordance with examples as disclosed herein. In some examples, aspects of the operations of 1005 may be performed by an enrollment request component 725 as described with reference to FIG. 7.

At 1010, the method may include validating the second authenticator in response to the request. The operations of 1010 may be performed in accordance with examples as disclosed herein. In some examples, aspects of the operations of 1010 may be performed by a validation component 730 as described with reference to FIG. 7.

At 1015, the method may include enabling the first authenticator to attest a first characteristic of a set of multiple characteristics associated with the first authenticator in response to validating the second authenticator, where the first authenticator is enabled to attest the first characteristic based on the first characteristic being common to the first authenticator and the second authenticator. The operations of 1015 may be performed in accordance with examples as disclosed herein. In some examples, aspects of the operations of 1015 may be performed by an authenticator attestation component 735 as described with reference to FIG. 7.

At 1020, the method may include determining an assurance level associated with the first authenticator in accordance with the first characteristic that is common to the first authenticator and the second authenticator. The operations of 1020 may be performed in accordance with examples as disclosed herein. In some examples, aspects of the operations of 1020 may be performed by an assurance level component 740 as described with reference to FIG. 7.

At 1025, the method may include enabling the first authenticator to attest a second characteristic of the set of multiple characteristics associated with the first authenticator based on an action that validates the second characteristic. The operations of 1025 may be performed in accordance with examples as disclosed herein. In some examples, aspects of the operations of 1025 may be performed by an authenticator attestation component 735 as described with reference to FIG. 7.

At 1030, the method may include updating the assurance level associated with the first authenticator based on validating the second characteristic, where the assurance level is updated in accordance with the second characteristic. The operations of 1030 may be performed in accordance with examples as disclosed herein. In some examples, aspects of the operations of 1030 may be performed by an assurance level component 740 as described with reference to FIG. 7.

A method for managing assurance levels at a first device is described. The method may include obtaining, at a software platform of the first device, a request to enroll a first authenticator for accessing a resource via the software platform, where the request uses a second authenticator to authorize enrollment of the first authenticator, validating the second authenticator in response to the request, enabling the first authenticator to attest a first characteristic of a set of multiple characteristics associated with the first authenticator in response to validating the second authenticator, where the first authenticator is enabled to attest the first characteristic based on the first characteristic being common to the first authenticator and the second authenticator, and enabling the first authenticator to attest a second characteristic of the set of multiple characteristics associated with the first authenticator based on an action that validates the second characteristic.

An apparatus for managing assurance levels at a first device is described. The apparatus may include a processor, memory coupled with the processor, and instructions stored in the memory. The instructions may be executable by the processor to cause the apparatus to obtain, at a software platform of the first device, a request to enroll a first authenticator for accessing a resource via the software platform, where the request uses a second authenticator to authorize enrollment of the first authenticator, validate the second authenticator in response to the request, enable the first authenticator to attest a first characteristic of a set of multiple characteristics associated with the first authenticator in response to validating the second authenticator, where the first authenticator is enabled to attest the first characteristic based on the first characteristic being common to the first authenticator and the second authenticator, and enable the first authenticator to attest a second characteristic of the set of multiple characteristics associated with the first authenticator based on an action that validates the second characteristic.

Another apparatus for managing assurance levels at a first device is described. The apparatus may include means for obtaining, at a software platform of the first device, a request to enroll a first authenticator for accessing a resource via the software platform, where the request uses a second authenticator to authorize enrollment of the first authenticator, means for validating the second authenticator in response to the request, means for enabling the first authenticator to attest a first characteristic of a set of multiple characteristics associated with the first authenticator in response to validating the second authenticator, where the first authenticator is enabled to attest the first characteristic based on the first characteristic being common to the first authenticator and the second authenticator, and means for enabling the first authenticator to attest a second characteristic of the set of multiple characteristics associated with the first authenticator based on an action that validates the second characteristic.

A non-transitory computer-readable medium storing code for managing assurance levels at a first device is described. The code may include instructions executable by a processor to obtain, at a software platform of the first device, a request to enroll a first authenticator for accessing a resource via the software platform, where the request uses a second authenticator to authorize enrollment of the first authenticator, validate the second authenticator in response to the request, enable the first authenticator to attest a first characteristic of a set of multiple characteristics associated with the first authenticator in response to validating the second authenticator, where the first authenticator is enabled to attest the first characteristic based on the first characteristic being common to the first authenticator and the second authenticator, and enable the first authenticator to attest a second characteristic of the set of multiple characteristics associated with the first authenticator based on an action that validates the second characteristic.

Some examples of the method, apparatuses, and non-transitory computer-readable medium described herein may further include operations, features, means, or instructions for determining an assurance level associated with the first authenticator in accordance with the first characteristic that may be common to the first authenticator and the second authenticator and updating the assurance level associated with the first authenticator based on validating the second characteristic, where the assurance level may be updated in accordance with the second characteristic.

Some examples of the method, apparatuses, and non-transitory computer-readable medium described herein may further include operations, features, means, or instructions for authorizing enrollment of the first authenticator in response to the request and based on validating the second authenticator, where enabling the first authenticator to attest the first characteristic may be based on the enrollment of the first authenticator.

In some examples of the method, apparatuses, and non-transitory computer-readable medium described herein, the action that validates the second characteristic may include operations, features, means, or instructions for validating a third authenticator associated with the second characteristic in response to the enrollment of the first authenticator.

Some examples of the method, apparatuses, and non-transitory computer-readable medium described herein may further include operations, features, means, or instructions for obtaining an indication that configures the software platform to trigger the action that validates the second characteristic in response to the enrollment of the first authenticator.

In some examples of the method, apparatuses, and non-transitory computer-readable medium described herein, the request may be obtained from a second device and the method, apparatuses, and non-transitory computer-readable medium may include further operations, features, means, or instructions for obtaining a second request from a third device to validate a third authenticator associated with the second characteristic, where the third authenticator may be enrolled on the third device, and where the action that validates the second characteristic includes validating the third authenticator.

In some examples of the method, apparatuses, and non-transitory computer-readable medium described herein, the second device and the third device may be associated with a same user.

Some examples of the method, apparatuses, and non-transitory computer-readable medium described herein may further include operations, features, means, or instructions for validating the third authenticator may be based on a distance between the second device and the third device satisfying a threshold distance.

In some examples of the method, apparatuses, and non-transitory computer-readable medium described herein, the second device may be associated with a first user and the third device may be associated with a second user.

Some examples of the method, apparatuses, and non-transitory computer-readable medium described herein may further include operations, features, means, or instructions for validating the third authenticator may be based on a distance between the first user and the second user satisfying a threshold distance.

In some examples of the method, apparatuses, and non-transitory computer-readable medium described herein, a first connection used to obtain the request may be different from a second connection used to obtain the second request.

In some examples of the method, apparatuses, and non-transitory computer-readable medium described herein, the action that validates the second characteristic may include operations, features, means, or instructions for obtaining an indication that the second device satisfies a criterion.

Some examples of the method, apparatuses, and non-transitory computer-readable medium described herein may further include operations, features, means, or instructions for obtaining a second request to access the resource, where the second request uses the first authenticator to authorize access to the resource, validating the first authenticator in response to receiving the second request, and authorizing access to the resource in response to validating the first authenticator and based on the first authenticator being enabled to attest the first characteristic and the second characteristic.

In some examples of the method, apparatuses, and non-transitory computer-readable medium described herein, the software platform includes an identity provider.

The following provides an overview of aspects of the present disclosure:

Aspect 1: A method for managing assurance levels at a first device, comprising: obtaining, at a software platform of the first device, a request to enroll a first authenticator for accessing a resource via the software platform, wherein the request uses a second authenticator to authorize enrollment of the first authenticator; validating the second authenticator in response to the request; enabling the first authenticator to attest a first characteristic of a plurality of characteristics associated with the first authenticator in response to validating the second authenticator, wherein the first authenticator is enabled to attest the first characteristic based at least in part on the first characteristic being common to the first authenticator and the second authenticator; and enabling the first authenticator to attest a second characteristic of the plurality of characteristics associated with the first authenticator based at least in part on an action that validates the second characteristic.

Aspect 2: The method of aspect 1, further comprising: determining an assurance level associated with the first authenticator in accordance with the first characteristic that is common to the first authenticator and the second authenticator; and updating the assurance level associated with the first authenticator based at least in part on validating the second characteristic, wherein the assurance level is updated in accordance with the second characteristic.

Aspect 3: The method of any of aspects 1 through 2, further comprising: authorizing enrollment of the first authenticator in response to the request and based at least in part on validating the second authenticator, wherein enabling the first authenticator to attest the first characteristic is based at least in part on the enrollment of the first authenticator.

Aspect 4: The method of aspect 3, wherein the action that validates the second characteristic comprises: validating a third authenticator associated with the second characteristic in response to the enrollment of the first authenticator.

Aspect 5: The method of any of aspects 1 through 4, further comprising: obtaining an indication that configures the software platform to trigger the action that validates the second characteristic in response to the enrollment of the first authenticator.

Aspect 6: The method of any of aspects 1 through 5, wherein the request is obtained from a second device, the method further comprising: obtaining a second request from a third device to validate a third authenticator associated with the second characteristic, wherein the third authenticator is enrolled on the third device, and wherein the action that validates the second characteristic comprises validating the third authenticator.

Aspect 7: The method of aspect 6, wherein the second device and the third device are associated with a same user.

Aspect 8: The method of aspect 7, wherein validating the third authenticator is based at least in part on a distance between the second device and the third device satisfying a threshold distance.

Aspect 9: The method of aspect 6, wherein the second device is associated with a first user and the third device is associated with a second user.

Aspect 10: The method of aspect 9, wherein validating the third authenticator is based at least in part on a distance between the first user and the second user satisfying a threshold distance.

Aspect 11: The method of any of aspects 6 through 10, wherein a first connection used to obtain the request is different from a second connection used to obtain the second request.

Aspect 12: The method of any of aspects 1 through 11, wherein the request is obtained from a second device associated with the second characteristic, and wherein the action that validates the second characteristic comprises: obtaining an indication that the second device satisfies a criterion.

Aspect 13: The method of any of aspects 1 through 12, further comprising: obtaining a second request to access the resource, wherein the second request uses the first authenticator to authorize access to the resource; validating the first authenticator in response to receiving the second request; and authorizing access to the resource in response to validating the first authenticator and based at least in part on the first authenticator being enabled to attest the first characteristic and the second characteristic.

Aspect 14: The method of any of aspects 1 through 13, wherein the software platform comprises an identity provider.

Aspect 15: An apparatus for managing assurance levels at a first device, comprising a processor; memory coupled with the processor; and instructions stored in the memory and executable by the processor to cause the apparatus to perform a method of any of aspects 1 through 14.

Aspect 16: An apparatus for managing assurance levels at a first device, comprising at least one means for performing a method of any of aspects 1 through 14.

Aspect 17: A non-transitory computer-readable medium storing code for managing assurance levels at a first device, the code comprising instructions executable by a processor to perform a method of any of aspects 1 through 14.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for managing assurance levels at a first device, comprising:
    obtaining, at a software platform of the first device, a first request to enroll a first authenticator for accessing a resource via the software platform, wherein the first request uses a second authenticator to authorize enrollment of the first authenticator;
    validating the second authenticator in response to the first request;
    enabling, in response to validating the second authenticator and based at least in part on a first characteristic associated with the first authenticator being common to the first authenticator and the second authenticator, the first authenticator to attest the first characteristic associated with the first authenticator;
    enabling, based at least in part on a first assurance level associated with the first characteristic failing to satisfy a threshold assurance level associated with the resource and on a triggering action that validates a second characteristic associated with the first authenticator, the first authenticator to attest the second characteristic, wherein the second characteristic is different from the first characteristic; and
    in response to enabling the first authenticator to attest the second characteristic, adjusting an assurance level associated with the first authenticator to a second assurance level that satisfies the threshold assurance level associated with the resource.

2. The method of claim 1, further comprising:
    authorizing the enrollment of the first authenticator in response to the first request and based at least in part on validating the second authenticator, wherein enabling the first authenticator to attest the first characteristic is based at least in part on the enrollment of the first authenticator.

3. The method of claim 2, wherein the triggering action that validates the second characteristic comprises validating a third authenticator associated with the second characteristic in response to the enrollment of the first authenticator.

4. The method of claim 1, further comprising:
obtaining an indication that configures the software platform to trigger the triggering action that validates the second characteristic.

5. The method of claim 1, wherein the first request is obtained from a second device, the method further comprising:
obtaining a second request from a third device to validate a third authenticator associated with the second characteristic, wherein the third authenticator is enrolled on the third device, and wherein the triggering action that validates the second characteristic comprises validating the third authenticator.

6. The method of claim 5, wherein the second device and the third device are associated with a same user.

7. The method of claim 5, wherein validating the third authenticator is based at least in part on a distance between the second device and the third device satisfying a threshold distance.

8. The method of claim 5, wherein the second device is associated with a first user and the third device is associated with a second user.

9. The method of claim 5, wherein a first connection used to obtain the first request is different from a second connection used to obtain the second request.

10. The method of claim 1, wherein the first request is obtained from a second device associated with the second characteristic, and wherein the triggering action that validates the second characteristic comprises obtaining an indication that the second device satisfies a criterion.

11. The method of claim 1, further comprising:
obtaining a second request to access the resource, wherein the second request uses the first authenticator to authorize access to the resource;
validating the first authenticator in response to receiving the second request; and
authorizing access to the resource in response to validating the first authenticator and based at least in part on the first authenticator being enabled to attest the first characteristic and the second characteristic.

12. The method of claim 1, wherein the software platform comprises an identity provider.

13. An apparatus for managing assurance levels at a first device, comprising:
a processor;
memory coupled with the processor; and
instructions stored in the memory and executable by the processor to cause the apparatus to:
obtain, at a software platform of the first device, a first request to enroll a first authenticator for accessing a resource via the software platform, wherein the first request uses a second authenticator to authorize enrollment of the first authenticator;
validate the second authenticator in response to the first request;
enable, in response to validation of the second authenticator and based at least in part on a first characteristic associated with the first authenticator being common to the first authenticator and the second authenticator, the first authenticator to attest the first characteristic associated with the first authenticator;
enable, based at least in part on a first assurance level associated with the first characteristic failing to satisfy a threshold assurance level associated with the resource and on a triggering action that validates a second characteristic associated with the first authenticator, the first authenticator to attest the second characteristic, wherein the second characteristic is different from the first characteristic; and
in response to enablement of the first authenticator to attest the second characteristic, adjust an assurance level associated with the first authenticator to a second assurance level that satisfies the threshold assurance level associated with the resource.

14. The apparatus of claim 13, wherein the instructions are further executable by the processor to cause the apparatus to:
authorize the enrollment of the first authenticator in response to the first request and based at least in part on validation of the second authenticator, wherein enablement of the first authenticator to attest the first characteristic is based at least in part on the enrollment of the first authenticator.

15. The apparatus of claim 14, wherein the triggering action that validates the second characteristic comprises validation of a third authenticator associated with the second characteristic in response to the enrollment of the first authenticator.

16. The apparatus of claim 13, wherein the instructions are further executable by the processor to cause the apparatus to:
obtain an indication that configures the software platform to trigger the triggering action that validates the second characteristic.

17. The apparatus of claim 13, wherein the first request is obtained from a second device, and
wherein the instructions are further executable by the processor to cause the apparatus to:
obtain a second request from a third device to validate a third authenticator associated with the second characteristic, wherein the third authenticator is enrolled on the third device, and wherein the triggering action that validates the second characteristic comprises validation of the third authenticator.

18. The apparatus of claim 17, wherein validation of the third authenticator is based at least in part on a distance between the second device and the third device satisfying a threshold distance.

19. The apparatus of claim 13, wherein the instructions are further executable by the processor to cause the apparatus to:
obtain a second request to access the resource, wherein the second request uses the first authenticator to authorize access to the resource;
validate the first authenticator in response to receipt of the second request; and
authorize access to the resource in response to validation of the first authenticator and based at least in part on the first authenticator being enabled to attest the first characteristic and the second characteristic.

20. A non-transitory computer-readable medium storing code for managing assurance levels at a first device, the code comprising instructions executable by a processor to:
obtain, at a software platform of the first device, a first request to enroll a first authenticator for accessing a resource via the software platform, wherein the first request uses a second authenticator to authorize enrollment of the first authenticator;

validate the second authenticator in response to the first request;

enable, in response to validation of the second authenticator and based at least in part on a first characteristic associated with the first authenticator being common to the first authenticator and the second authenticator, the first authenticator to attest the first characteristic associated with the first authenticator;

enable, based at least in part on a first assurance level associated with the first characteristic failing to satisfy a threshold assurance level associated with the resource and on a triggering action that validates a second characteristic associated with the first authenticator, the first authenticator to attest the second characteristic, wherein the second characteristic is different from the first characteristic; and in response to enablement of the first authenticator to attest the second characteristic, adjust an assurance level associated with the first authenticator to a second assurance level that satisfies the threshold assurance level associated with the resource.

* * * * *